(12) United States Patent
Nagai et al.

(10) Patent No.: US 6,346,788 B1
(45) Date of Patent: Feb. 12, 2002

(54) ACTUATOR AND APPARATUS FOR CONTROLLING THE SAME

(75) Inventors: Shigekazu Nagai, Tokyo; Fumio Morikawa, Saitama-ken; Hiroyuki Shiomi, Ibaraki-ken, all of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/355,337

(22) PCT Filed: Jan. 30, 1998

(86) PCT No.: PCT/JP98/00409

§ 371 Date: Aug. 5, 1999

§ 102(e) Date: Aug. 5, 1999

(87) PCT Pub. No.: WO98/35435

PCT Pub. Date: Aug. 13, 1998

(30) Foreign Application Priority Data

Feb. 5, 1997 (JP) .............................................. 9-023043
Mar. 7, 1997 (JP) .............................................. 9-053674

(51) Int. Cl.[7] .................................................. H02P 7/00
(52) U.S. Cl. ....................... 318/432; 318/799; 318/560; 74/89.23; 74/424.71
(58) Field of Search ................................. 318/432, 434, 318/799, 802, 560, 568.17; 74/89.23, 424.71

(56) References Cited

U.S. PATENT DOCUMENTS

| | | | | |
|---|---|---|---|---|
| 4,656,726 A | * | 4/1987 | Suzuki et al. ................. 29/568 |
| 5,263,113 A | * | 11/1993 | Naitoh et al. ................. 388/815 |
| 5,445,045 A | * | 8/1995 | Nagai et al. .............. 74/490.09 |
| 5,469,215 A | * | 11/1995 | Nashiki ....................... 318/432 |
| 5,499,547 A | * | 3/1996 | Nagai et al. ................. 318/432 |
| 5,676,016 A | * | 10/1997 | Nagai et al. ................ 74/89.15 |
| 5,711,611 A | * | 1/1998 | Nagai et al. ................... 354/50 |
| 5,747,896 A | * | 5/1998 | Nagai et al. ................... 310/20 |
| 5,809,829 A | * | 9/1998 | Seto et al. .................. 74/89.15 |
| 6,142,030 A | * | 11/2000 | Nagai et al. ................ 74/89.15 |

FOREIGN PATENT DOCUMENTS

| | | |
|---|---|---|
| JP | 4-168988 | 6/1992 |
| JP | 6-226571 | 8/1994 |

* cited by examiner

*Primary Examiner*—Robert E. Nappi
*Assistant Examiner*—Rina Duda
(74) *Attorney, Agent, or Firm*—Oblon, Spivak, McClelland, Maier & Neustadt, P.C.

(57) ABSTRACT

A moving member 18 of an actuator 10 comprises a moving block 50 wherein an opening 48 which allows a driving force transmission shaft 16 to be inserted from the direction perpendicular to the axis thereof. A controlling device 400 for the actuator controls the amount of current supplied to a rotation drive source 21 on the basis of the manipulated variable control signal outputted though a torque limiter 8 for controlling the torque for the rotation drive source 21 detected by a torque conversion means 10 to the level of a torque limit limit value signal.

18 Claims, 19 Drawing Sheets

DIRECTION OF MOVEMENT
CCW ROTATION INSTRUCTION ⎯⎯⎯⎯⎯⎯⎯⎯⎯⎯→

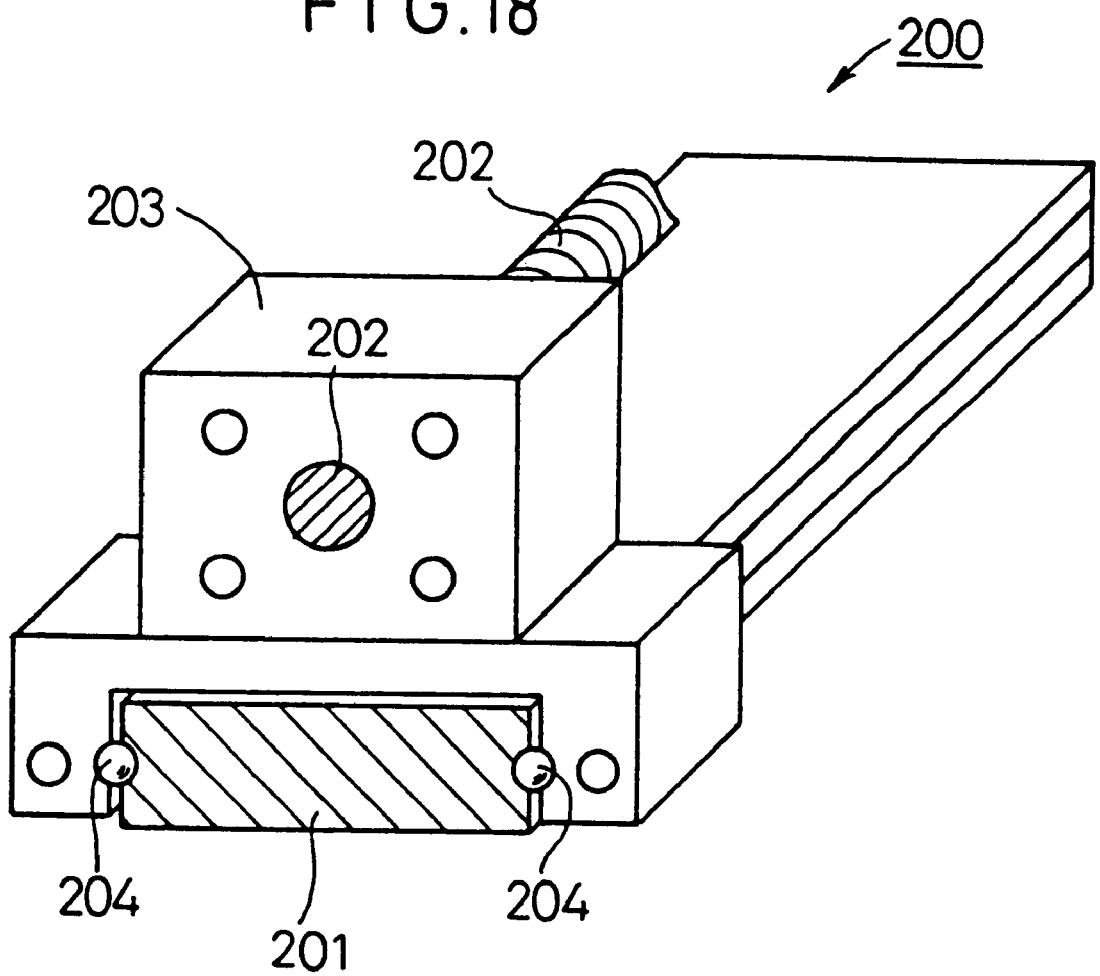

ACTUATOR AND APPARATUS FOR CONTROLLING THE SAME

TECHNICAL FIELD

The present invention relates to an actuator which can convey a workpiece, etc., for example, under the displacing action of the moving member and the controlling device therefor.

BACKGROUND ART

The actuator has been conventionally used for such a purpose as conveying a workpiece. As shown in FIG. 18, this actuator 200 comprises an elongate guide base 201 having a rectangular-shaped cross section; a feed screw shaft 202 both ends whereof are supported by bearing blocks (not shown) so that it can be freely rotated, and whereto the rotation drive force of the drive source (not shown) is transmitted; and a moving member 203 wherein a threaded hole engaging the feed screw shaft 202 is formed as a through-hole, and which is moved in both directions along the longitudinal axis of the guide base 201 under the rotating action of the feed screw shaft 202.

By providing balls 204 between the guide base 201 and the moving member 203, this actuator 200 is configured so that the moving member 203 can be smoothly moved in both directions under the rolling action of the balls 204.

However, with the actuator 200 according to the prior art, when, for example, the thread of the feed screw shaft 202 is worn out, resulting in the linear accuracy for the moving member 203 being lowered, or the feed screw shaft 202 is to be replaced with other feed screw shaft having a different diameter, or other driving force transmission member such as a ball screw shaft, the feed screw shaft 202, moving member 203, etc., which form a unit, must be integrally replaced, which makes the replacement operation cumbersome. In addition, not only the feed screw shaft 202 but also the moving member 203 must be replaced, and thus a problem of the cost being increased arises.

Also, with the actuator 200 according to the prior art, when the user intends to use the actuator, meeting specifications different from the normal ones to suit to the operating environment, it is difficult to reassemble the actuator 200 to the desired configuration after disassembling, and the reassembling operation to provide the desired configuration is extremely cumbersome, and thus a problem of the cost rising is caused.

Conventionally, a motor-operated actuator 300 as shown in FIG. 19, for example, is known. The motor-operated actuator 300 as shown in FIG. 19 is formed to be elongate along the longitudinal axis, comprising a frame 320 provided with a set of substantially parallel guide rails 318a and 318b, and a moving member 330 which is displaced along the longitudinal axis of the frame 320 under the guide by the guide rails 318a and 318b.

In a concavity 321 defined in the frame 320, a ball screw shaft 316 is supported along the longitudinal axis, and to a moving member 330 is fixed a bearing block 341 wherein a threaded hole (not shown) engaging the ball screw shaft 316 is formed. In addition, the motor-operated actuator 300 comprises a supporting block 342 which is fixed to one end portion of the frame 320 and supports the ball screw shaft 316 so that it can be freely rotated, and a brushless motor 322 fixed to the other end of the frame 320 and constituting the driving section for rotation-driving the ball screw shaft 316.

With the motor-operated actuator 300 configured as above, when the brushless motor 322 is driven by supplying the power to the brushless motor 322, the rotation drive force of the rotor (not shown) of the brushless motor 322 is transmitted to the ball screw shaft 316, resulting in the ball screw shaft 316 being rotation-driven in the set direction.

As the ball screw shaft 316 is rotation-driven, the moving member 330 is smoothly and linearly displaced along the guide rails 318a and 318b through the bearing block 341 engaged with the ball screw shaft 316, and thus the workpiece (not shown) loaded on the moving member 330 can be conveyed.

The numerals 310a and 310b denote stoppers fixed to one end and the other end of the frame 320, respectively, limiting the movable range for the moving member 330.

However, for a conventional motor-operated actuator 300 as described above, it has been desired that, when the workpiece loaded on the moving member 330 is conveyed along the frame 320, the torque for the drive source be limited for such a purpose as slowing down the movement of the moving member 330 in such a case as that when a foreign matter or other is sandwiched between the moving member 330 and the stopper 310a or 310b at either end of the frame 320, or when the moving member 330 is struck against the stopper 310a or 310b at either end of the frame 320.

This is also true when the motor-operated actuator 300 is installed vertically so that the moving member 330 is displaced in a vertical direction, and when the moving member 330 is displaced downward, the lowering speed is increased by the rotation drive force of the drive source and the weight of the workpiece itself, thus it has been required to allow no foreign matter or other to be sandwiched between the moving member 330 and the stopper 310a or 310b.

Thus, as a controlling device for a conventional motor-operated actuator 300, a friction plate (not shown) or other is provided between the drive source and the ball screw shaft 316 so as to serve as a torque limiter, and when an excessive load is impressed, the friction plate is caused to slip so that an excessive drive force is prevented from being applied to the moving member 330, thus torque control of the drive source being performed.

However, with the conventional method as stated above, the tightening force for the torque limiter must be preset at a desired value before the drive source is assembled, and in such a case as that when the weight of the workpiece itself is to be changed due to the change of the workpiece to be loaded, it is difficult to change the torque limit value for the torque limiter, thus a problem of the degree of freedom of changing the torque limit value being absent has been presented.

The present invention is intended to offer an actuator and a controlling device therefor which allows only the driving force transmission shaft to be replaced conveniently and inexpensively, and reassembled conveniently to suit to the operating environment, yet allows the torque limit value for the rotation drive source to be easily set and changed.

DISCLOSURE OF THE PRESENT INVENTION

With the actuator according to the present invention, an opening which allows the driving force transmission shaft to be inserted from the direction perpendicular to the axis thereof is formed in the moving block, and thus assembling and maintenance operations for the driving force transmission shaft can be made with convenience.

Further, with the controlling device for the actuator according to the present invention, the level of the manipulated variable control signal which controls the rotational speed of the rotation drive source to the speed based on the generated speed pattern is level-limited to the level of the torque limit value signal, and on the basis of the level-limited manipulated variable control signal, the amount of current supplied to the rotation drive source for the actuator is controlled, which results in the torque for the rotation drive source being controlled to the level of the torque limit limit value signal.

Therefore, the torque for the rotation drive source is controlled on the basis of the torque limit value signal, and the torque limit value signal can be easily set, thus, the torque setting for the rotation drive source can be easily changed to suit to the operating conditions, which allows the torque to be set at an optimum value for the workpiece conditions.

BRIEF DESCRIPTION OF THE DRAWINGS

FIG. 18 shows a perspective view of an actuator according to the prior art; and

BEST MODE FOR CARRYING OUT THE INVENTION

For the actuator and the controlling device therefor according to the present invention, preferred embodiments thereof will be explained in detail with reference to the accompanying drawings.

Figure 1:
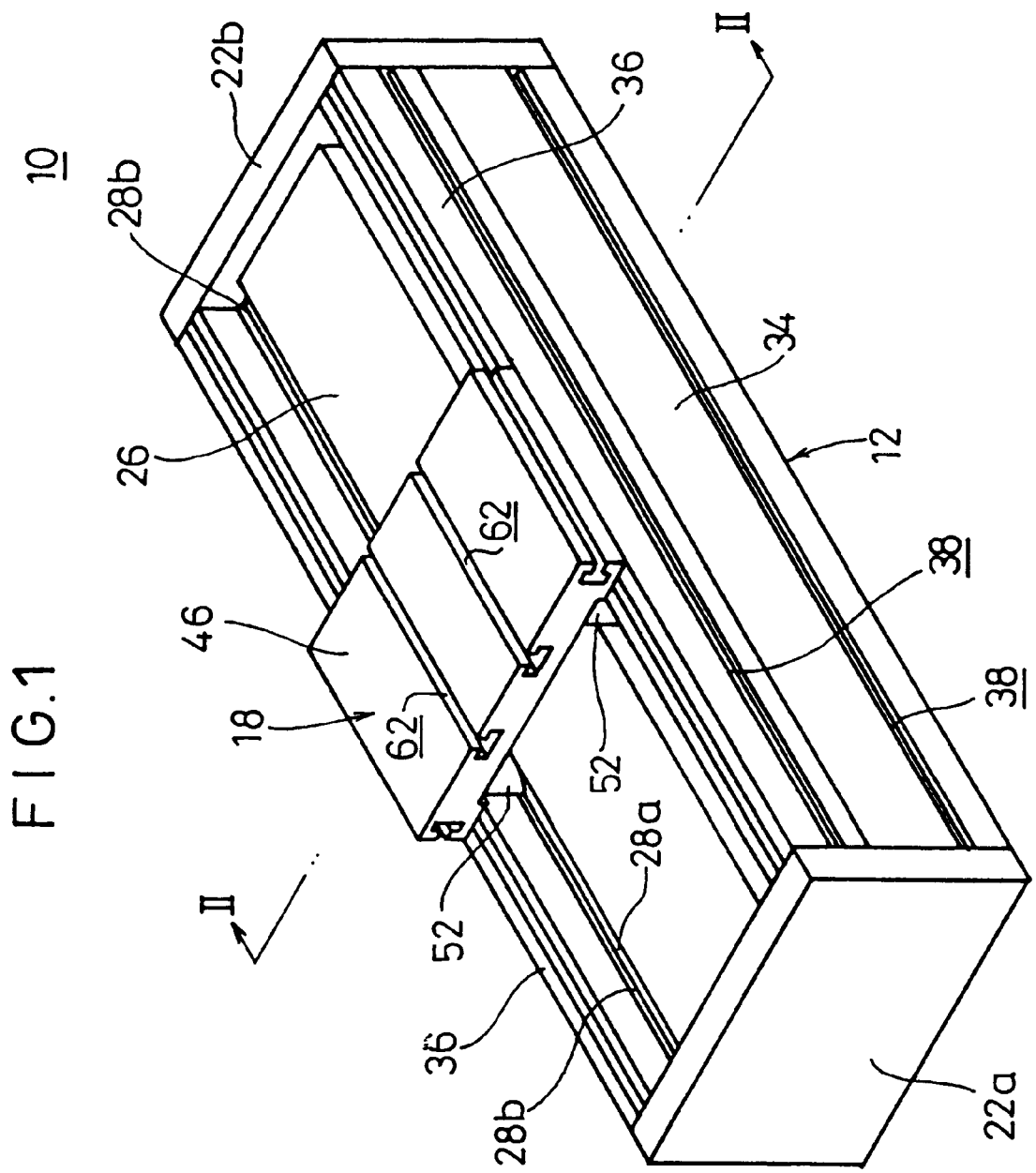
FIG. 1 shows a perspective view of an actuator according to an embodiment of the present invention.
Figure 2:
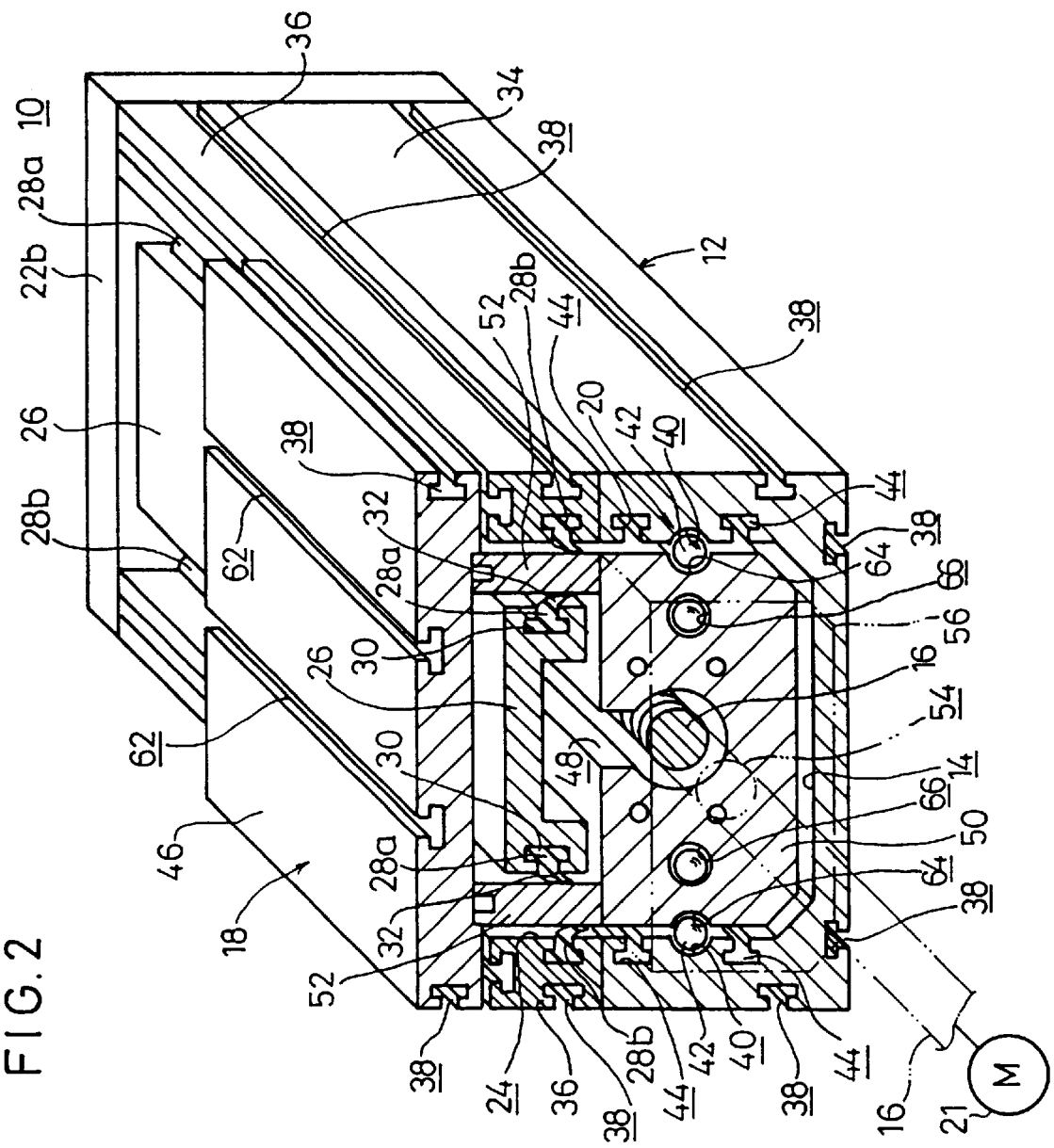
FIG. 2 shows a longitudinal sectional view taken along line II—II in FIG. 1.

The reference numeral 10 in FIG. 1 and FIG. 2 denotes an actuator according to an embodiment of the present invention.

The actuator 10 comprises a frame 12 having a U-shaped section and formed to be elongate; a driving section fixed in the concavity 14 of the frame 12 or connected to one end portion of the frame 12; a feed screw shaft 16 functioning as a driving force transmission member to transmit the driving force of the driving section; a moving member 18 being displaced along the longitudinal axis of the frame 12 under the action of the driving force transmitted through the feed screw shaft 16; and a guide mechanism 20 to guide the moving member 18 along the longitudinal axis of the frame 12. The surface of the frame 12 is provided with a hard alumite treatment.

The driving section may comprise, for example, a rotation drive source 21, such as a motor, as shown in FIG. 2, a hydraulic pressure cylinder (not shown), wherein the piston loaded in the cylinder chamber operates in both directions under the action of pressurized fluid, or a combination of the rotation drive source 21 with a hydraulic pressure cylinder.

Further, the actuator 10 is provided with a set of end plates 22a and 22b, which block the openings at both ends when viewed along the longitudinal axis of the frame 12, respectively, and function as a stopper to limit the movable range of the moving member 18, and the end plates 22a and 22b support a top cover 26, which blocks the opening 24 at the top of the frame 12. On each of both sides of the top cover 26, as shown in FIG. 2, a long groove having a T-shaped cross section is formed along the longitudinal axis, and a sealing member 28a is loaded along the long groove. In addition, also on the frame 12 side, a long groove similar to the above-mentioned one is formed, and in this long groove is installed a sealing member 28b, which is opposed to the sealing member 28a on the top cover 26 side.

The sealing members 28a and 28b are held in the long grooves in the top cover 26 and the frame 12, comprising a holding portion 30 which has a geometry corresponding to the sectional geometry of the long groove, and a lip portion 32 which has a flexibility, being formed integrally with the holding portion 30. The set of sealing members 28a and 28b are provided along the longitudinal axis of the frame 12 so that parts of them overlap each other, resulting in the gap between the frame 12 and the top cover 26 being closed up, and when the moving member 18 is moved, the lip portions 32 of the sealing members 28a and 28b are contacted with a later described connection plate to be bent downward, and thus the dirt and dust, and other matters produced inside the frame 12 can be prevented from getting out of the frame 12.

Therefore, the actuator 10 according to the embodiment can be favorably used in a clean room or other environment which requires cleanness. The lip potion 32 may be forked into two at the tip, and be formed so that one (not shown) of the forked lip portions is bent upward, while the other (not shown) is bent downward.

With the frame 12, a first block member 34 constituting the lower side is integrally formed with a set of second block members 36, which are connected to the side portions protruding upward from both edge portions of the first block member 34. In this case, the first block member 34 and the second block members 36 are assembled into an integral part by, for example, welding, screw-fastening, or using jointing members, such as later described connection ones.

Thus, by dividing the frame 12 into a first block member 34 and a set of second block members 36, which are a separate member, respectively, and forming the first block member 34 and the second block members 36 with the use of an identical material or dissimilar materials of metal, magnetic substance, or other, respectively, a frame 12 having portions which are different from each other in strength so as to accommodate different impressed loads can be integrally formed.

In this case, for example, it is preferable to form the first block member 34 with such a material as steel and SUS 440, and the second block members 36 with such a material as SUS, aluminum, and magnesium.

In the bottom surface and the outer wall surfaces opposed to each other of the frame 12 are formed long grooves 38 having a T-shaped cross section and extending along the longitudinal axis, and in the set portion of the long groove 38 is loaded such a component as a sensor (not shown). In addition, in the inner wall surfaces of the first block member 34 constituting the frame 12 are formed rolling grooves 40 having a circular arc-shaped cross section, and along the rolling grooves 40, a plurality of balls 42 are provided so that they can be rolled freely. Further, in the inner wall surfaces of the first block member 34 are formed a plurality of fluid passages 44 extending along the longitudinal axis, and when a hydraulic pressure cylinder (not shown), for example, is used as the driving section, a pressurized fluid can be fed to the hydraulic pressure cylinder or discharged from the hydraulic pressure cylinder through the piping members (not shown) inserted into the fluid passages 44.

In the outer wall surfaces of the second block members 36 are formed long grooves 38 having the same shape as that of the long grooves 38 in the first block member 34, and in the inner wall surface opposite to the outer wall surface is formed a seal holding long groove to hold a later described sealing member.

The moving member 18 comprises a plate portion 46 formed in a plate-like shape; a moving block 50 which is connected to the bottom of the plate portion 46, and wherein an opening 48 having a circular arc-shaped section and surrounding a feed screw shaft 16 in a non-contact state is formed; a pair of connection plates 52 placed between the plate portion 46 and the moving block 50 to separate these with the set spacing; and a bearing block 56 which is connected to one side (one side perpendicular to the direction of movement of the moving member 18) of the moving block 50 by, for example, screw-fastening so that it can be freely mounted and removed, and wherein a threaded hole 54 engaging the feed screw shaft 16 is formed as a through-hole (see FIG. 2).

Figure 3:
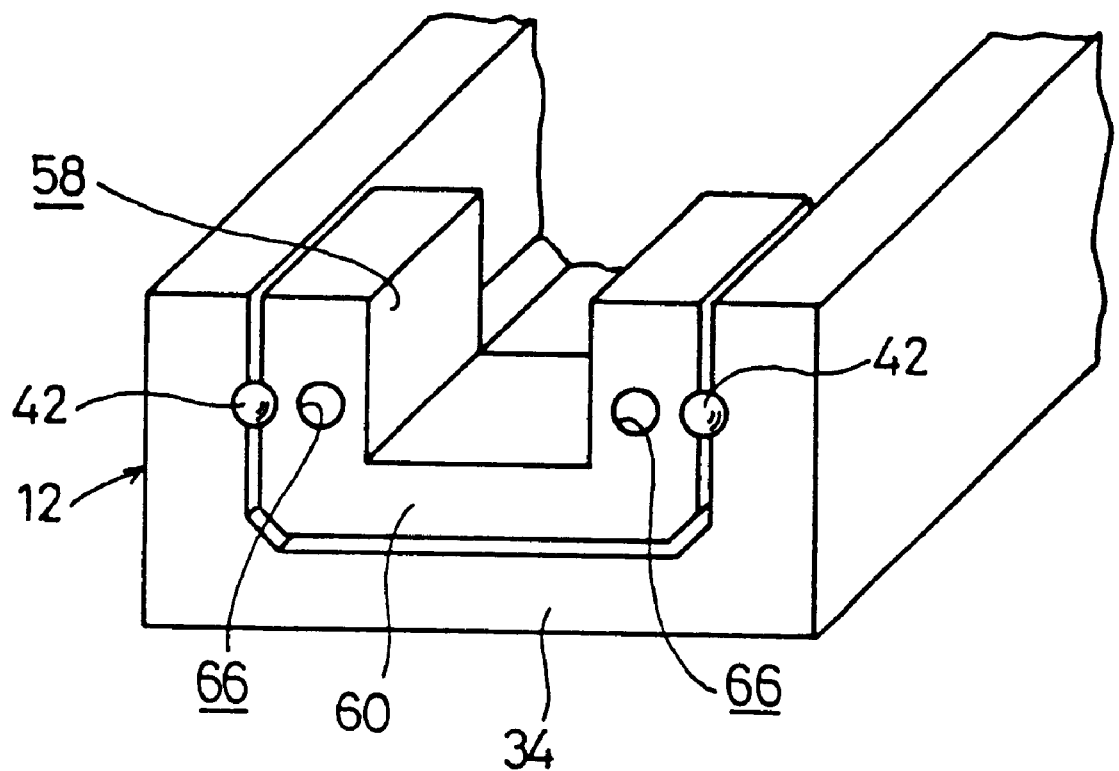
FIG. 3 shows a perspective view illustrating a modification of the moving block constituting the actuator in FIG. 2.

In this case, by forming the end of the connection plate 52 in a tapered shape like a prow, the sliding resistance against the sealing member 28 when the moving member 18 is moved is reduced (see FIG. 1). In addition, the width of the opening 48 formed in the moving block 50 is set to be larger than the diameter of the feed screw 16. The geometry of the moving block 50 is not limited to that as shown in FIG. 2, and for example, as shown in FIG. 3, a moving block 60 having an opening 58 of a rectangular-shaped cross section may be used.

Figure 4:
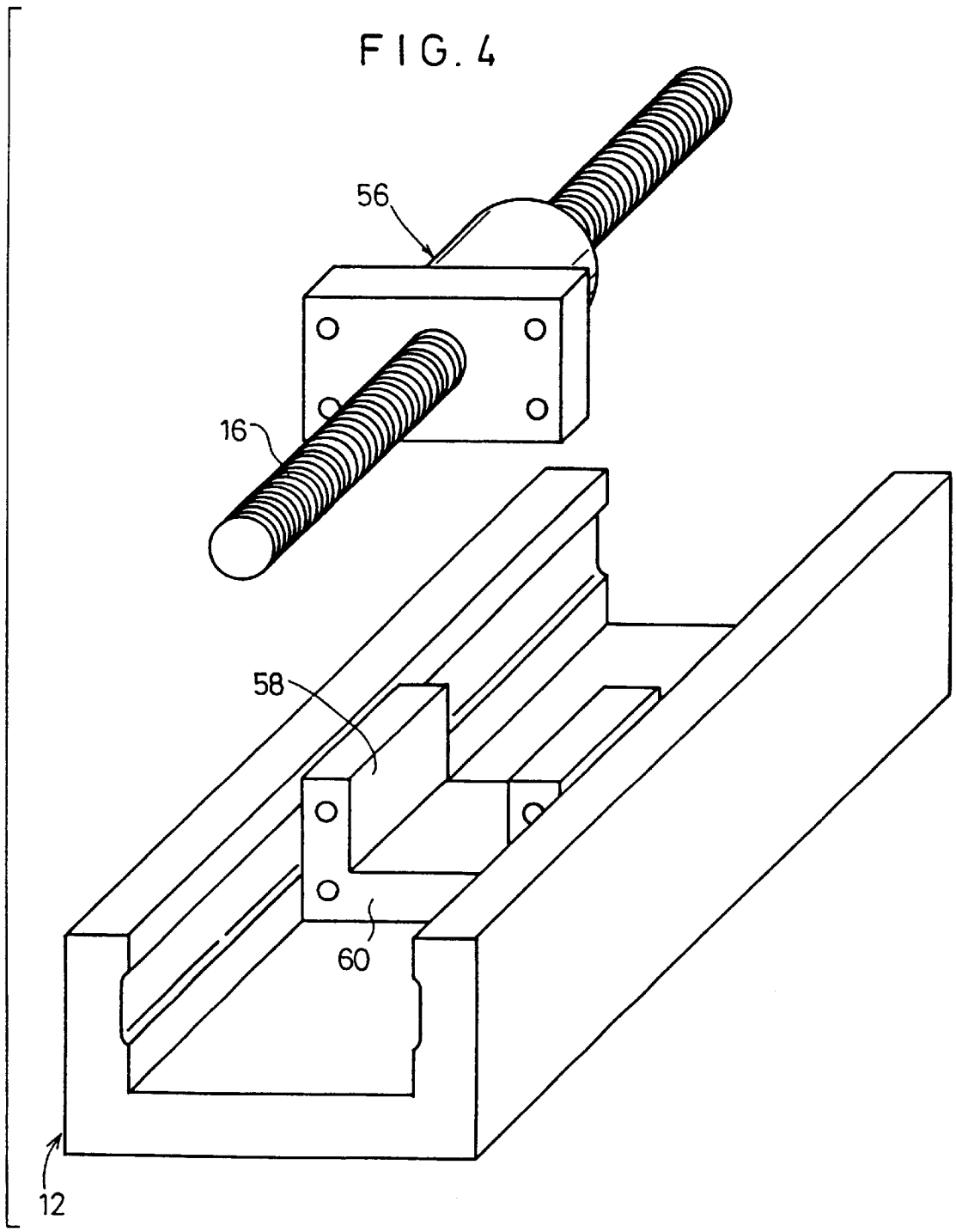
FIG. 4 shows an exploded perspective view illustrating a modification of the bearing block constituting the actuator in FIG. 2.

The bearing block 56 may be formed by using a rectangular plate material as shown in FIG. 2, or, integrally connecting the rectangular plate material with a cylindrical member as shown in FIG. 4. Between the set of connection plates 52 is formed a space portion which the top cover 26 occupies. In the top of the plate portion 46, two mounting grooves 62 having a T-shaped cross section to mount a workpiece (not shown) are formed substantially in parallel with each other.

With the guide mechanism 20, the rolling grooves 40 having a circular arc-shaped cross section which are formed in the inner wall surfaces of the first block member 34 constituting the frame 12 and rolling grooves 64 having a circular arc-shaped cross section which are formed in the outer wall surfaces of the moving block 50 form circulating raceway tracks whereon the plurality of balls 42 roll, and each particular circulating raceway track is formed so that it is connected to a circulating hole 66 in the moving block 50 through a return passage (not shown).

The actuator 10 according to the embodiment of the present invention is basically configured as above, and the operation and effects will be described hereinafter.

By energizing, for example, the rotation drive source 21 as the driving section, the driving force of the rotation drive source 21 is transmitted to the feed screw shaft 16, which causes the feed screw shaft 16 to be rotated in the set direction. The driving force is transmitted to the moving member 18 through the bearing block 56 engaging the feed screw shaft 16, and the moving member 18 is displaced along the longitudinal axis of the frame 12.

In this case, the plurality of balls 42 are rolled along the circulating raceway tracks formed by the rolling grooves 40 for the first block member 34 constituting the frame 12 and the rolling grooves 64 for the moving block 50 constituting the moving member 18, which allows the moving member 18 to be displaced smoothly.

Further, for example, when the thread of the feed screw shaft 16 is worn out, resulting in the linear accuracy for the moving member 18 being lowered, and thus the feed screw shaft 16 must be replaced with other new feed screw shaft 16, when the feed screw shaft 16 is to be replaced with other feed screw shaft (not shown) having a different diameter, or when the feed screw shaft 16 is to be replaced with other driving force transmission member (not shown) such as a ball screw shaft, the feed screw shaft 16 can be replaced with ease by removing the top cover 26 from the top of the frame 12, and then removing the bearing block 56 screw-fastened to one side of the moving block 50 constituting the moving member 18 from the moving block 50 together with the feed screw shaft 16. In other words, in the top of the moving block 50, the opening 48 is formed, which allows the feed screw shaft 16 to be easily removed from the top of the moving block 50 through the opening 48.

Figure 5A:
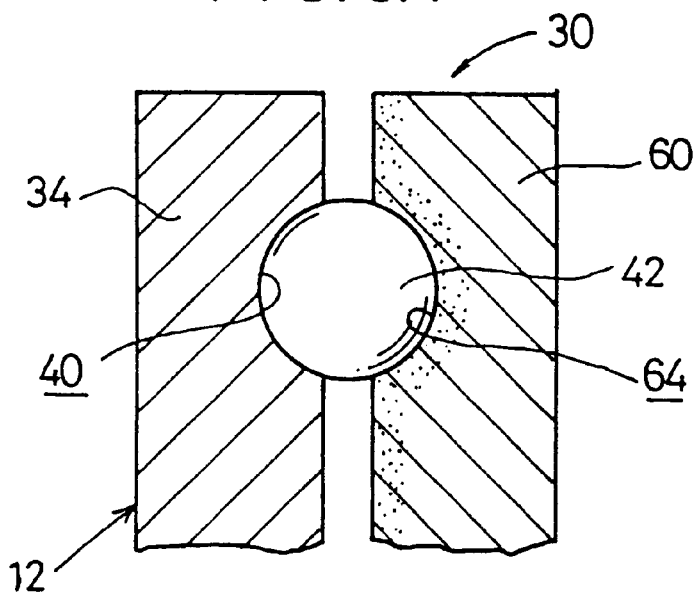
FIG. 5A shows a fragmentary sectional view illustrating the state wherein a hardening treatment is provided for a rolling groove constituting the guide mechanism.
Figure 5B:
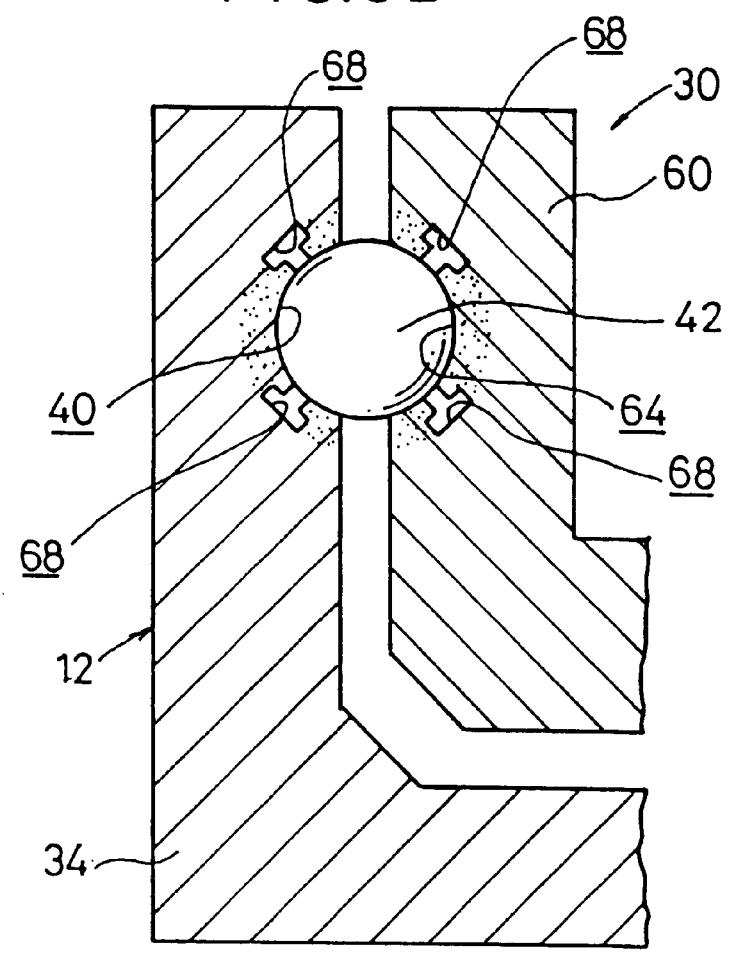
FIG. 5B shows a fragmentary sectional view illustrating the state wherein oil sump holes communicating with the rolling groove are formed.

Further, as shown in FIG. 5A, by quenching the rolling grooves 40 and 64 constituting the guide mechanism 20, respectively, before grinding them, and then making precision shot peening or other super precision finishing, the rolling surfaces of the rolling grooves 40 and 64 can be hardened to prevent them from wearing out. As shown in FIG. 5B, by providing a singularity or a plurality of oil sump holes 68 communicating with the rolling surfaces of the rolling grooves 40 and 64, the lubricity of the balls 42 can be improved. In this case, the balls 42 may be made of such a material as aluminum, polyimide, and super high polymer polyethylene, while the first block member may be made of aluminum, and the rolling grooves 40 and 64 may be provided with a surface treatment by Kanigen (registered trademark) plating. In this case, it is more preferable to install a nonwoven fabric to adsorb dirt and dust included in the lubricant in the oil sump holes 68.

Figure 6:
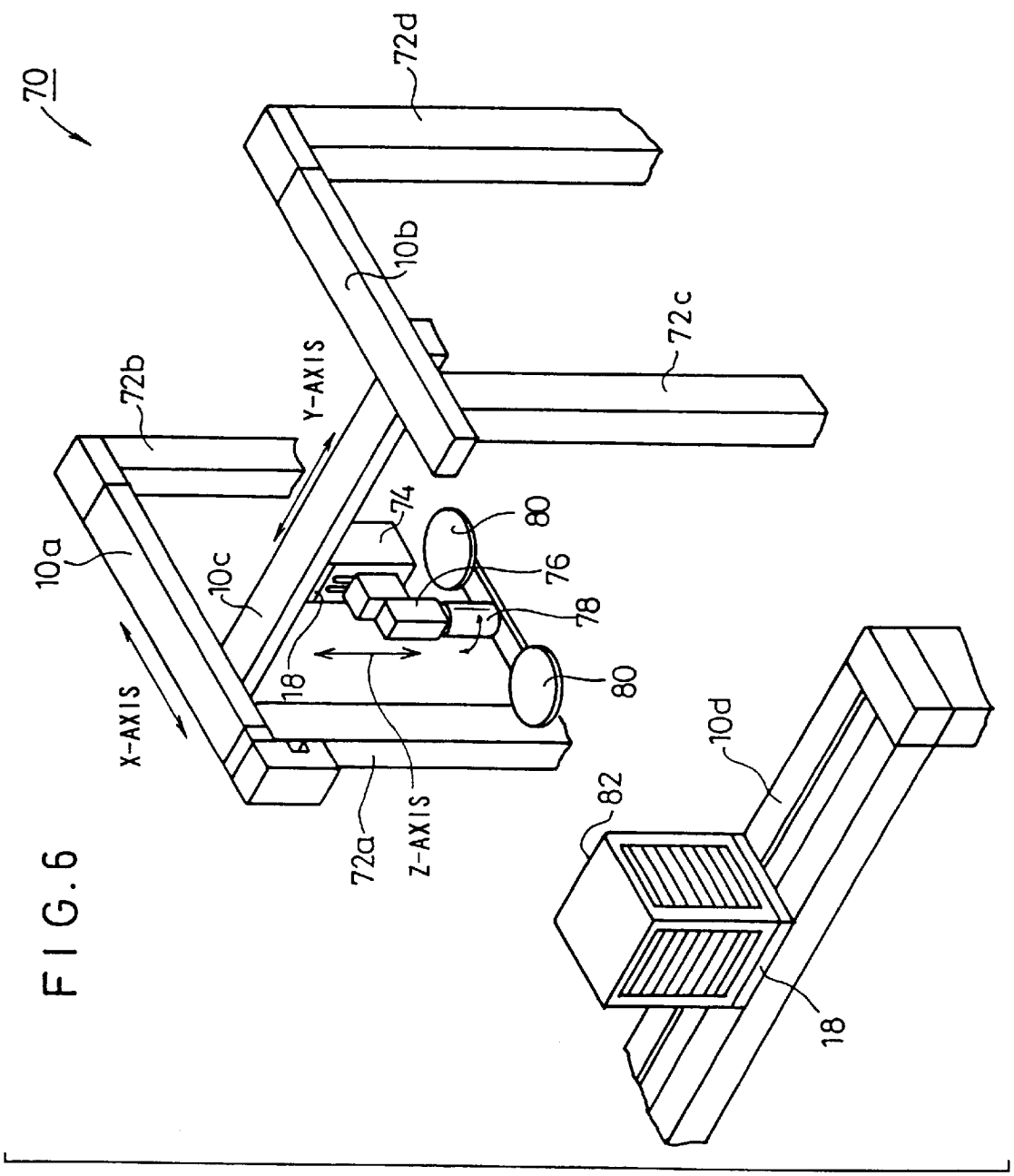
FIG. 6 shows a schematic perspective view illustrating the state wherein the actuator in FIG. 1 is incorporated in a conveying system for semiconductor wafers.

Next, in FIG. 6 is shown the state wherein the actuator 10 according to the embodiment is incorporated in a conveying system 70 for semiconductor wafers installed in a clean room.

The conveying system 70 comprises four pillar-like members 72a to 72d installed substantially along the perpendicular direction through fixing means (not shown); a first actuator 10a and a second actuator 10b which are transversely mounted on a set of pillar-like members 72a and 72b, respectively, and each have a moving member (not shown) which can be moved along the X-axis direction; and a third actuator 10c installed so that it can be freely moved along the X-axis direction, being connected to the respective moving members.

The moving member 18 for the third actuator 10c is installed so that it can be freely moved along the Y-axis direction, and to the moving member 18 is attached a vacuum chuck 76 which can be freely moved along the Z-axis direction through a displacement mechanism 74. By driving the vacuum chuck 76, a pair of semiconductor wafers 80 can be turned through the set angle in the direction of arrow around a shaft portion 78 as the fulcrum.

The conveying system 70 has a fourth actuator 10d provided with a moving member 18 which is displaced along the Y-axis direction. On the top of the moving member 18 is loaded a box 82 to contain the semiconductors 80, and after the semiconductors 80 held by the vacuum chuck 76 are sequentially placed in the box 82, the box 82 is carried to the set position under the driving action of the fourth actuator 10d.

Next, modifications of the actuator according to the embodiment are shown in FIG. 7 to FIG. 11.

Figure 7:
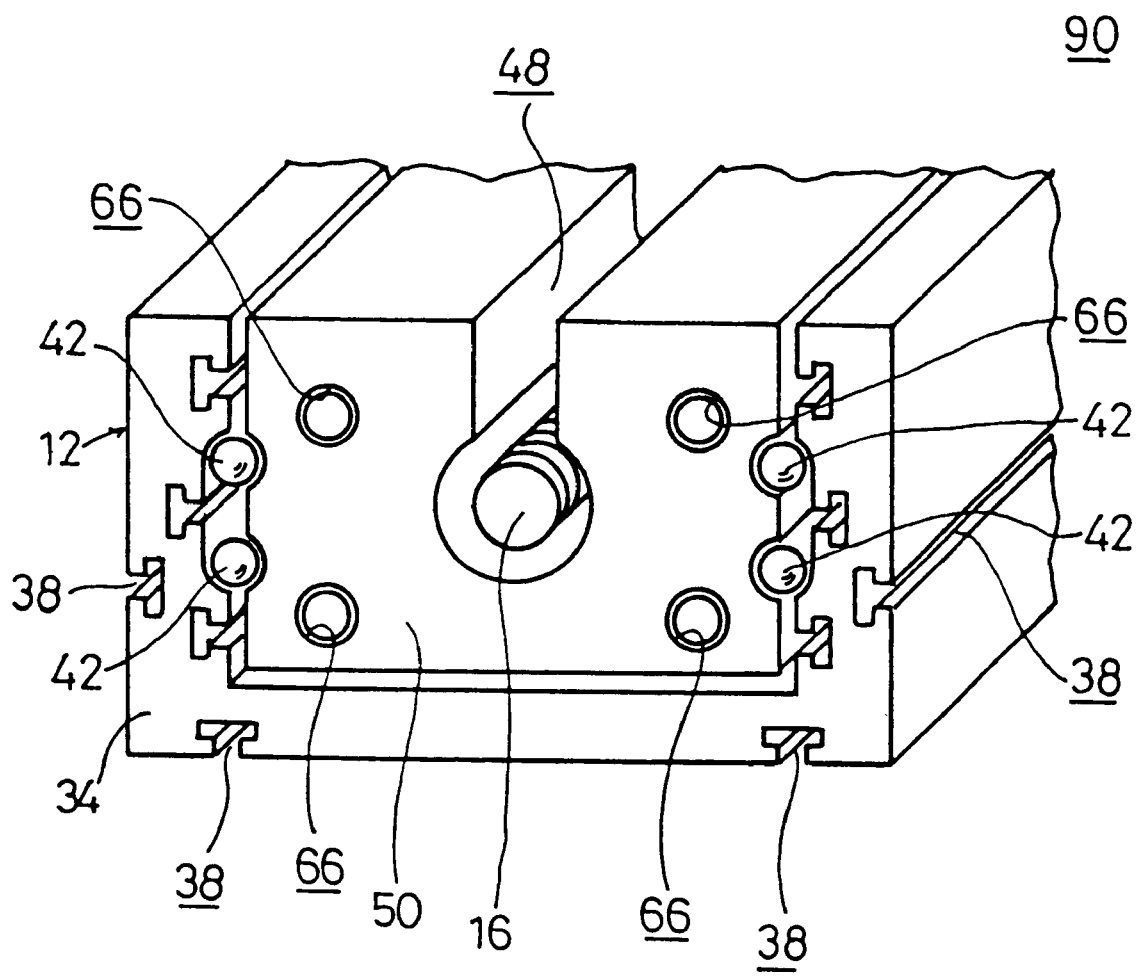
FIG. 7 shows a fragmentary perspective view illustrating a modification of the actuator in FIG. 1.

With an actuator 90 as shown in FIG. 7, the first block member 34 for the actuator 10 according to the embodiment is used singly as a frame 12. In addition, a plurality of circulating raceway tracks whereon balls 42 roll are arranged on one side.

Figure 8:
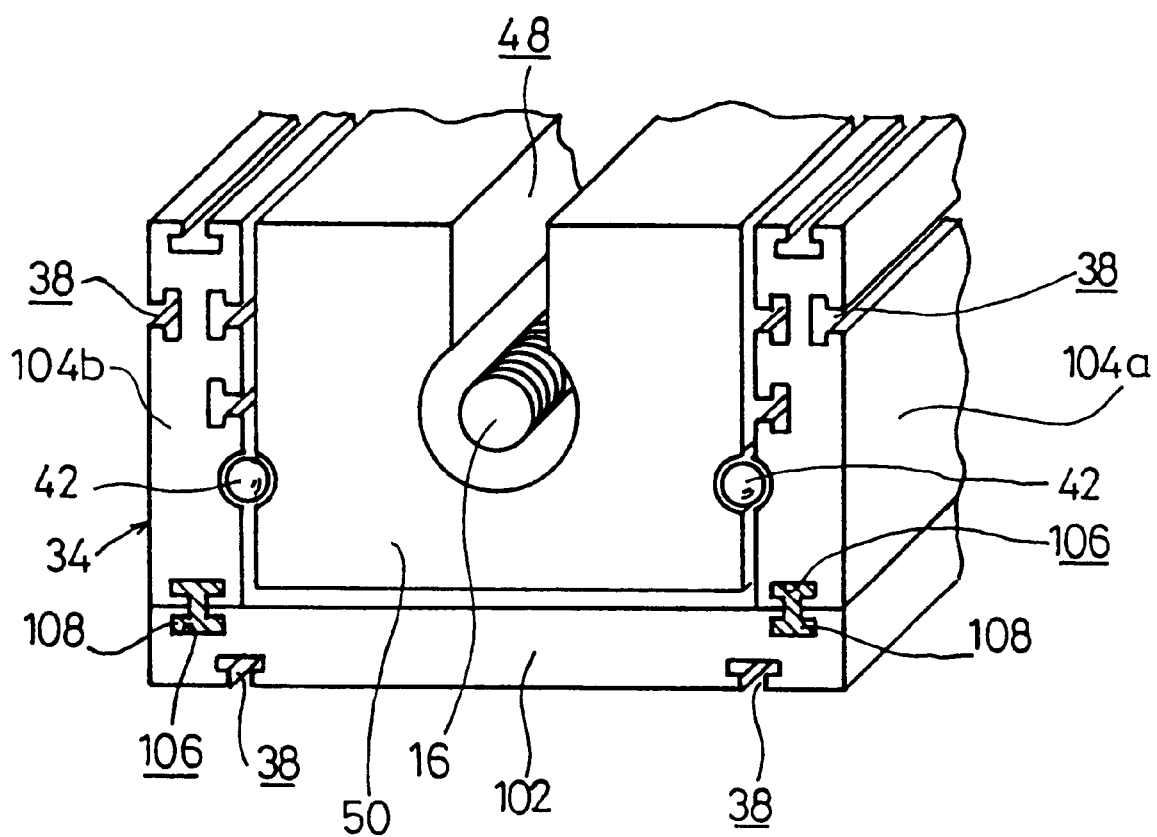
FIG. 8 shows a fragmentary perspective view illustrating a modification of the actuator in FIG. 1.

With an actuator 100 as shown in FIG. 8, the first block member 34 is further divided into three. In other words, the first block member 34 comprises a flat plate 102 and a pair of side plates 104a and 104b which are opposed to each other, being connected on the top of the plate 102 and separated from each other with the set spacing, and is provided so that it can be freely assembled by fitting connection members 108 into grooves 106 having a T-shaped cross section which are formed in the jointing surfaces of the plate 102 and the side plates 104a and 104b, respectively.

Figure 9:
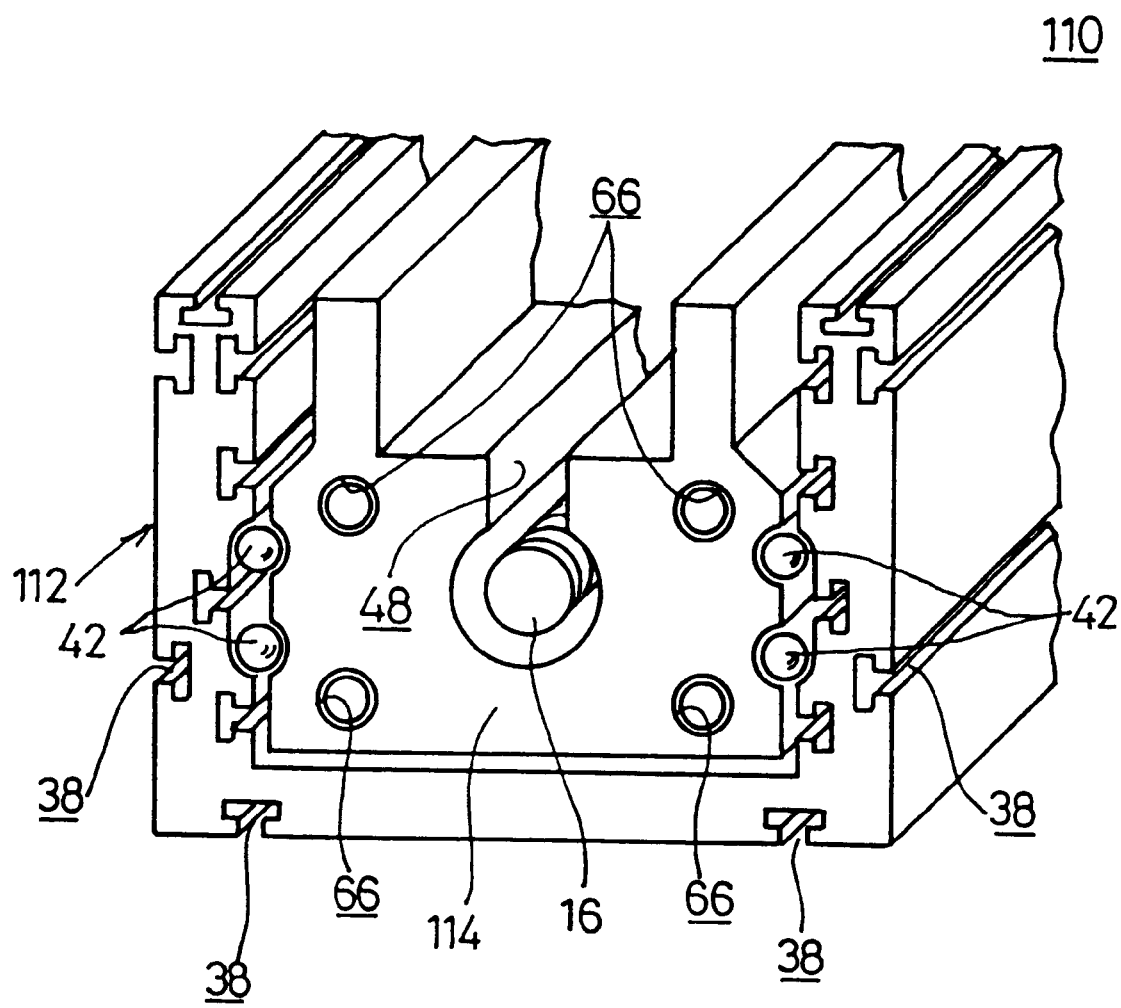
FIG. 9 shows a fragmentary perspective view illustrating a modification of the actuator in FIG. 1.

With an actuator 110 as shown in FIG. 9, a frame 112 is formed by integrally extruding or drawing the first block member 34 and the second block member 36, and a moving member 114 is formed by integrally extruding or drawing the moving block 50 and the connection plates 52 as shown in FIG. 2.

Figure 10:
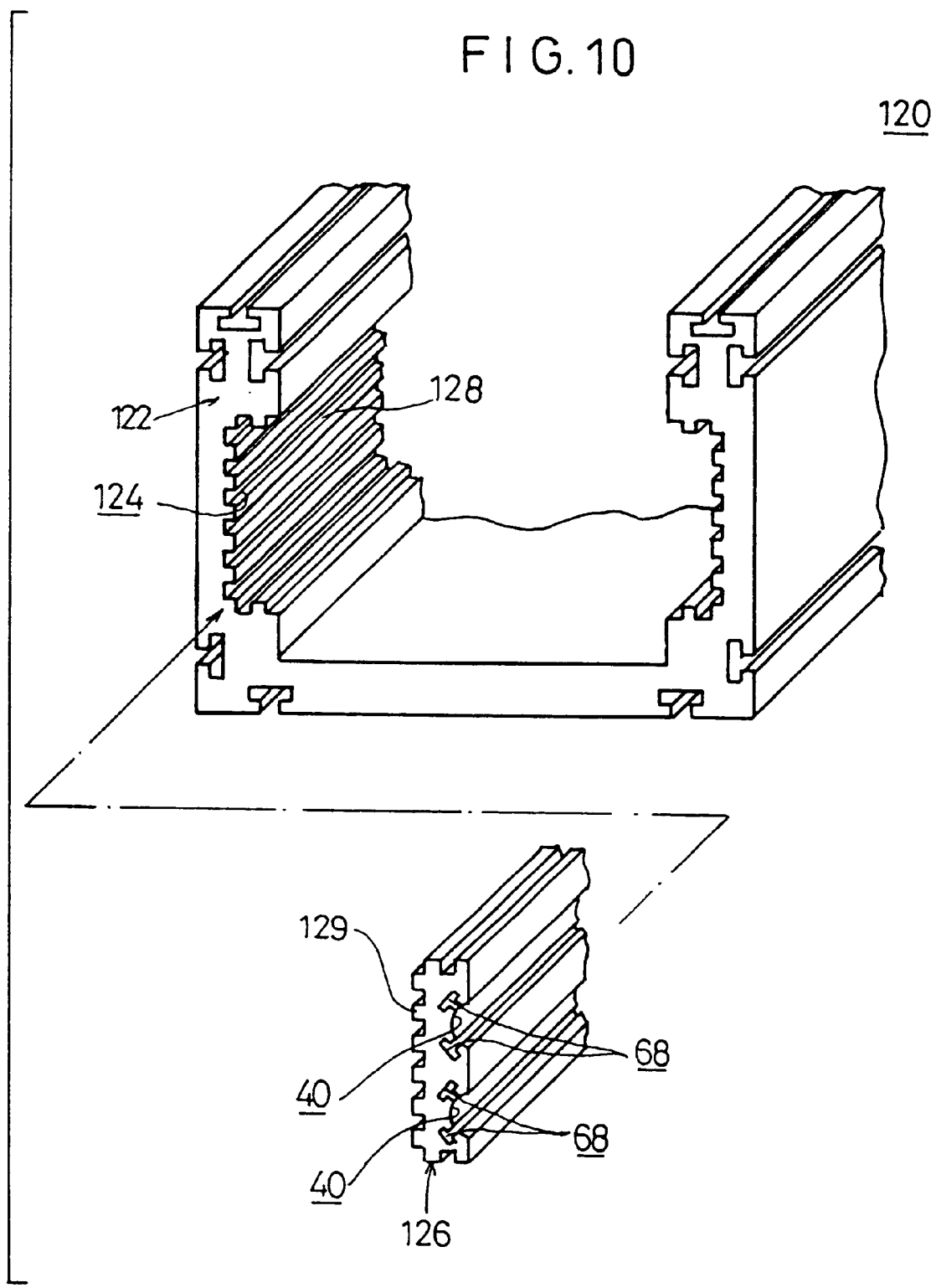
FIG. 10 shows a fragmentary exploded perspective view illustrating a modification of the actuator in FIG. 1.

With an actuator 120 as shown in FIG. 10, to facilitate machining of the rolling surfaces, a member 126 wherewith rolling grooves 40 are formed is integrally assembled into the concavity 124 in the inner wall surface of a frame 122.

In other words, after integrally extruding or drawing the frame 122 so that a rectangular-shaped irregular surface 128 is formed on the inner wall surface, the member 126 wherewith an irregular surface 129 fitting to the irregular surface 128 is formed on one side, and rolling grooves 40 having a circular arc-shaped cross section are formed on the other side is assembled into the concavity 124 of the frame 122. In this case, by machining the rolling grooves 40 on the member 126 formed separately from the frame 122 rather than directly machining the rolling grooves 40 on the inner wall surface of the frame 122, machining of the rolling grooves 40 can be performed easily and efficiently.

Figure 11:
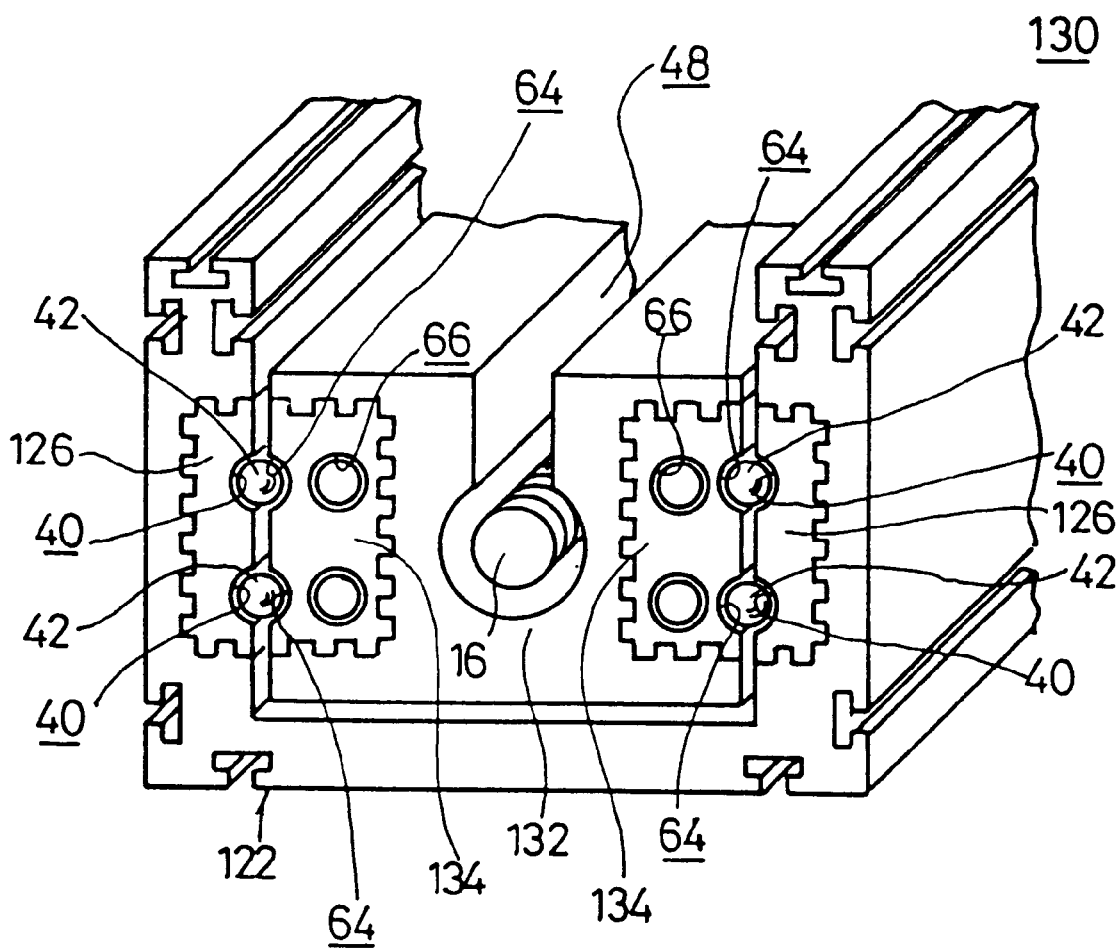
FIG. 11 shows a fragmentary perspective view illustrating a modification of the actuator in FIG. 1.

With an actuator 130 as shown in FIG. 11, also on the moving block 132 side, a separate member 134 wherewith rolling grooves 64 are previously formed is incorporated.

With the embodiment, all members of the actuators 10, 10a to 10d, 90, 100, 110, 120, and 130 may be made of an aluminum alloy except for the sealing members 28.

Figure 12:
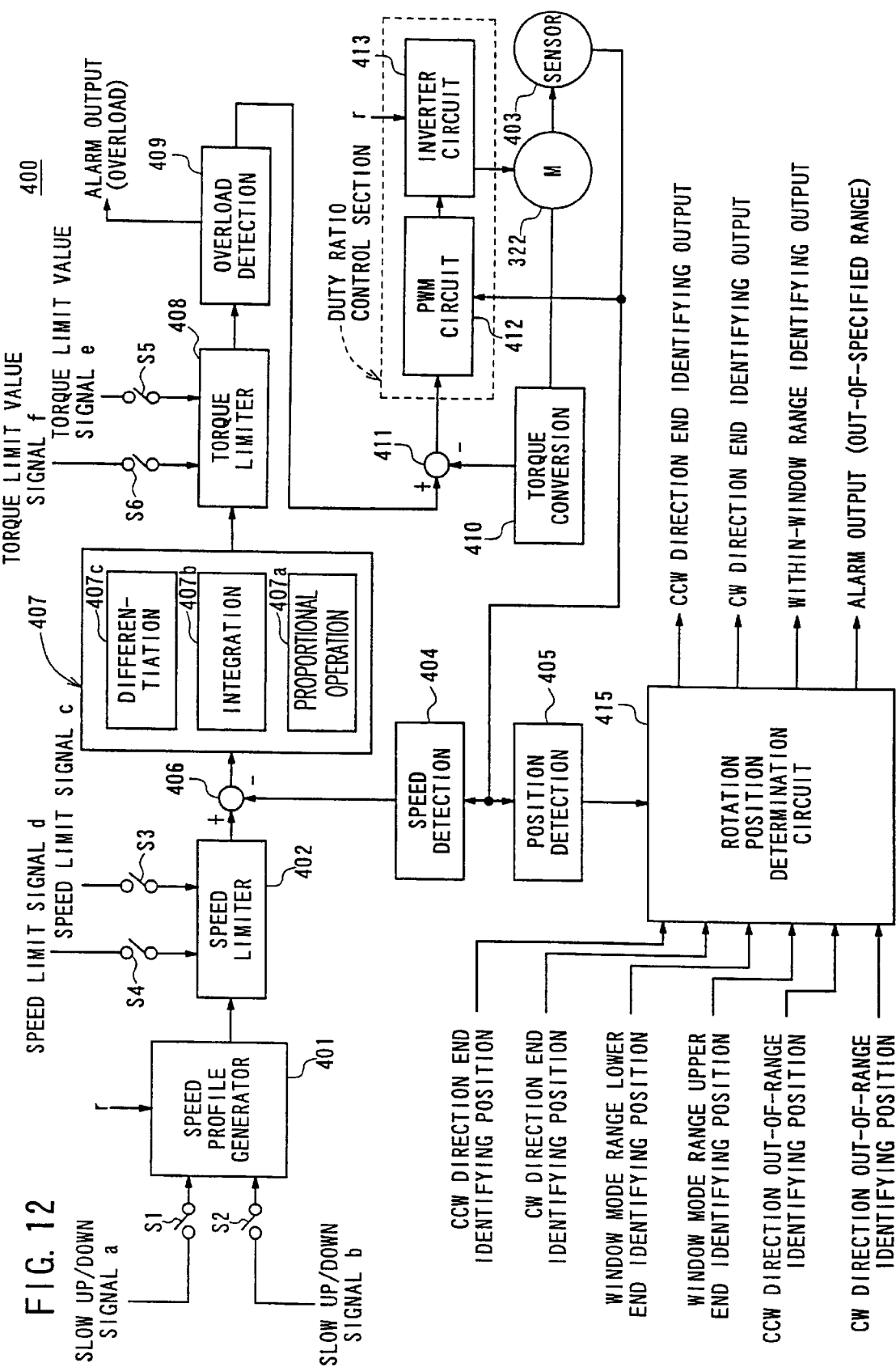
FIG. 12 shows a block diagram illustrating the configuration of a controlling device for the actuator according to an embodiment of the present invention.

Next, the configuration of a controlling device for the actuator according to an embodiment of the present invention is shown in FIG. 12. The same component as that of the actuator 10 as shown in FIG. 1 and FIG. 2 will be provided with the same reference numeral in the following description.

With this controlling device 400 for the actuator, a slow up/slow down signal a or b is supplied through a switch S1 or S2, and a moving direction specifying signal r for the moving member 18 is supplied, a speed profile generator 401 setting the moving speed pattern for the moving member 18 in cooperation with a speed limiter 402, which is later described. On the other hand, when a speed limiting signal c or d supplied through a switch S3 or S4 is received, and the output signal from the speed profile generator 401 reaches the speed limiting signal c or d, the speed limiter 402 limits the moving speed, thus the moving speed pattern for the moving member 18 being set.

In greater detail, a signal for the duty ratio set on the basis of the desired slope by use of a duty ratio setting device A or B (not shown), for example, is outputted as a slow up/slow down signal a or b. Through the switch S1 or S2 (whichever is turned on), the corresponding slow up/slow down signal a or b is supplied to the speed profile generator 401. Here, the slow up/slow down signal a or b supplied to the speed profile generator 401 is slow up- or slow down-processed. In addition, on the basis of the polarity of the moving direction specifying signal r supplied to the speed profile generator 401, the direction of rotation of the rotation drive source 21, such as a brushless motor, is switched over.

For example, when the moving direction specifying signal r has a positive polarity, the rotor of the rotation drive source 21 is rotation-driven in a counterclockwise direction, the duty ratio signal from the duty ratio setting device A being taken as a slow up signal, and the duty ratio signal from the duty ratio setting device B being taken as a slow up signal. When the moving direction specifying signal r has a negative polarity, the rotor is rotation-driven in a clockwise direction.

On the other hand, the function of the speed limiter 402 can be similarly described; the speed limiting signal c or d is a signal set correspondingly to the moving speed for the moving member 18 by means of a voltage setting device C or D (not shown), for example, and when the switch S3 is on, the speed limiting signal c is selected, while, when the switch S4 is on, the speed limiting signal d is selected.

Figure 13A:
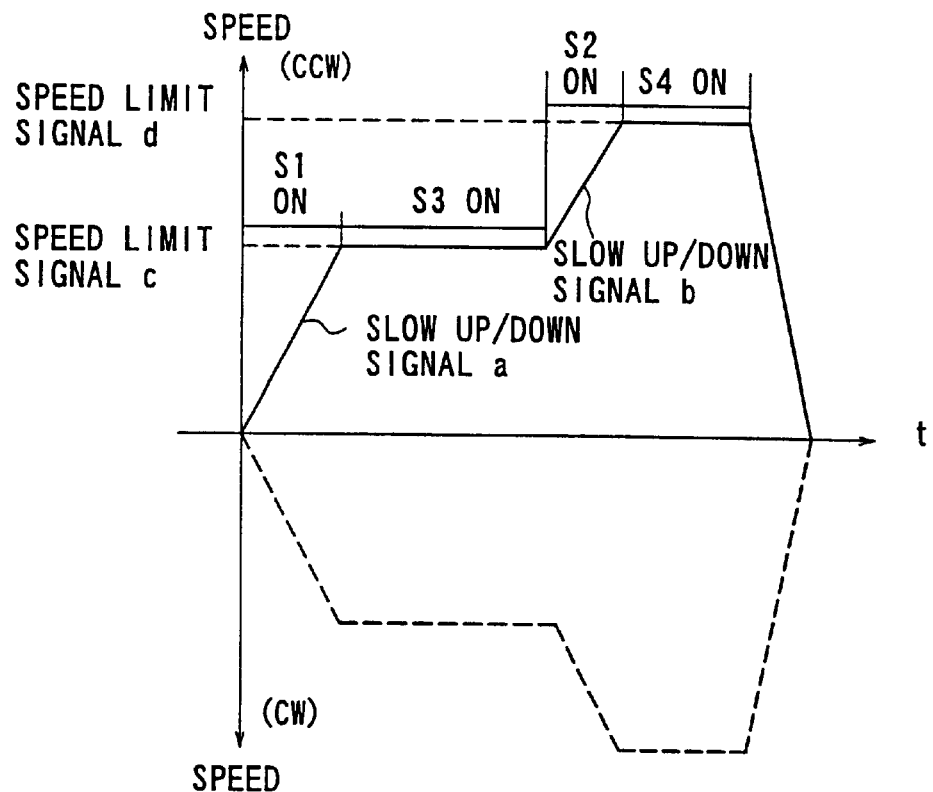
FIG. 13A and FIG. 13B show schemas for serving explanation of the moving speed pattern generated in the controlling device for the actuator as shown in FIG. 12.

Therefore, when the switch S1 and the switch S3 are selected, and the moving direction specifying signal r has a positive polarity, the speed is slowed up in accordance with the slope based on the slow up/slow down signal a, as shown with a solid line in FIG. 13A, and when the moving speed reaches the level of the speed limiting signal c, it is limited to the level of the speed limiting signal c for a time period when the switch S3 is in an ON state for the speed based on the speed limiting signal c. Then, when the switch S2 and the switch S4 are selected, the speed is slowed up in accordance with the slope based on the slow up/slow down signal b, and when the moving speed reaches the level of the speed limiting signal d, it is limited to the speed based on the speed limiting signal d for a time period when the switch S4 is in an ON state. Thus, the speed profile is set.

When the switch which is in an ON state is changed from S1 to S2, from S3 to S4, or vice versa, a similar operation is provided.

Figure 13B:
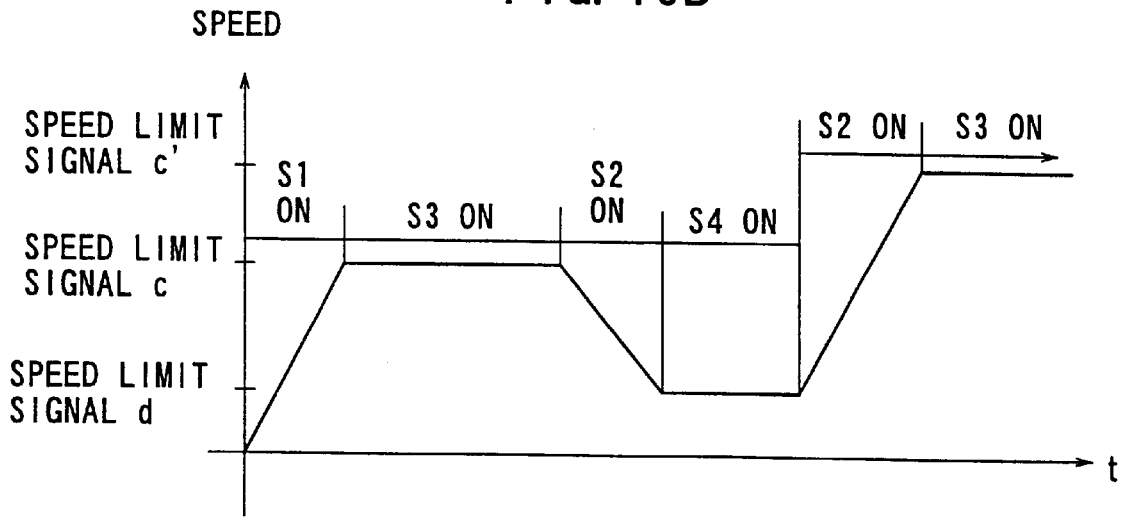

When the moving direction specifying signal r has a negative polarity, the rotor of the rotation drive source 21 is rotation-driven in a clockwise direction, and the speed is slowed down/slowed up on the basis of the slow up/slow down signal a or b, the speed profile being set as shown with a dotted line in FIG. 13A. Similarly, as shown in FIG. 13B, the speed profile can be set so that it comprises a plurality of trapezoid-like shapes, which are continuous, respectively.

On the other hand, the number of revolutions for the rotor of the rotation drive source 21 is detected by a sensor 403, such as a Hall device, which detects the magnetic pole position of the rotation drive source 21; the output from the sensor 403 is waveform-shaped to generate pulses synchronized with the rise and fall of the waveform-shaped output, the frequency of the pulses being detected by a speed detection means 404; and the difference between this speed detection output and the speed signal based on the speed profile outputted from the speed limiter 402 is determined by a deviation detection means 406.

The deviation signal outputted from the deviation detection means 406 is supplied to a controller 407 for proportional, integral, and differential actions, resulting in a proportional operation 407a, an integration 407b, and a differentiation 407c being performed, and a manipulated variable control signal as an output from the controller 407 being supplied to a torque limiter 408, and when the level of the manipulated variable control signal outputted from the controller 407 exceeds the level of the torque limit value signal e or f being supplied to the torque limiter 408, the excess portion is limited to the level of the torque limit value signal e or f. The manipulated variable control signal outputted from the controller 407 and supplied to the torque limiter 408 is a signal of torque information, and to the torque limiter 408, the torque limit value signal e or f is supplied through a switch S5 or S6, the level of the manipulated variable control signal outputted from the controller 407 being limited by the torque limiter 408 to the level of the torque limit value signal e or f which is being supplied to the switch S5 or S6, whichever is in an ON state.

As is the case with the speed limiting signal c or d, the torque limit value signals e and f are also set by a voltage setting device E or F.

The output signal from the torque limiter 408 is supplied to an overload detection circuit 409, and when an overload is detected, an alarm signal is issued.

On the other hand, the load current for the rotation drive source 21 is detected; a torque conversion means 410 converts the load current for the rotation drive source 21 into a torque signal based on the load current; the difference between the torque signal given by the torque conversion means 410 and the torque signal outputted from the overload detection circuit 409 is computed by an arithmetic circuit 411; the difference signal based on the difference computed by the arithmetic circuit 411 is supplied to a PWM modulation circuit 412; on the basis of the difference signal produced by the arithmetic circuit 411 and the coil information signal indicating the phase number of the stator coil in the rotation drive source 21 which is detected by the sensor 403, the PWM modulation output is supplied to an inverter circuit 413; and the duty ratio for the stator coil based on the coil information signal is controlled on the basis of the PWM modulation output, thus the rotation of the rotation drive source 21 being controlled. The PWM modulation circuit 412 and the inverter circuit 413 constitute the duty ratio control section. To switch over the direction of rotation of the rotation drive source 21, the moving direction specifying signal r which is being inputted to the speed profile generator 401 is supplied to the inverter circuit 413.

Here, when the level of the manipulated variable signal outputted from the controller 407 is below the level of the torque limit value signal being supplied to the torque limiter 408, the manipulated variable signal outputted from the controller 407 is passed through the torque limiter 408 and the overload detection circuit 409 without being level-limited, thus the rotation drive source 21 being rotation-driven on the basis of the difference between the manipulated variable control signal outputted from the controller 407 and the output from the torque conversion means 410.

When the level of the manipulated variable control signal outputted from the controller 407 equals to or exceeds the level of the torque limit value signal being supplied to the torque limiter 408, the manipulated variable control signal outputted from the controller 407, the excess portion thereof being limited to the level of the torque limit value signal, is passed through the overload detection circuit 409, being PWM modulated on the basis of the difference in level between the output signal delivered from the torque limiter 408 through the overload detection circuit 409 and the torque signal outputted from the torque conversion means 410, and to the stator coil on the basis of the coil information signal indicating the phase number of the stator coil which is detected by the sensor 403, the PWM-modulated current is supplied by the inverter circuit 413, thus the rotation of the rotation drive source 21 being controlled.

Therefore, when the level of the manipulated variable control signal passed through the torque limiter 408 exceeds the level of the signal outputted from the torque conversion means 410, the coil current for the rotor of the rotation drive source 21 is increased, and thus the torque is increased with the rotor of the rotation drive source 21 being rotation-driven at a higher speed. Contrarily, when the level of the manipulated variable control signal passed through the torque limiter 408 is below the level of the signal outputted from the torque conversion means 410, the coil current for the rotation drive source 21 is decreased, and thus the torque is decreased with the rotor of the rotation drive source 21 being essentially braked, and rotation-driven at a lower speed.

On the other hand, the output signal supplied to the speed detection means 404 from the sensor 403 is also supplied to a position detection means 405, and, by the position detection means 405, a U/D signal is generated on the basis of the direction of phase rotation for the signal outputted from the sensor 403 with the output from the sensor 403 being waveform-shaped to generate pulses synchronized with the rise and fall of the waveform-shaped output, and the pulses are counted in the direction based on the U/D signal. Thus, by the position detection means 405, the position of the moving member 18 is essentially detected.

The count value on the position detection means 405 is supplied to a rotation position determination circuit 415 as positional information for the moving member 18, and, by the rotation position determination circuit 415, the counterclockwise direction end identifying positional information, the clockwise direction end identifying positional information, the predetermined set range (stated as window mode range in FIG. 12) lower end positional information and upper end positional information, the counterclockwise direction out-of-range identifying positional information, the clockwise direction out-of-range identifying positional information, which are previously supplied to the rotation position determination circuit 415, are compared with the count value on the position detection means 405, resulting in a counterclockwise direction end identifying output, a clockwise direction end identifying output, a within-predetermined set range identifying output, or an alarm output being delivered in correspondence with the position of the moving member 18 based on the count value on the rotation position determination circuit 415.

Therefore, with the controlling device 400 for the actuator according to the present invention configured as above, in order to rotate the rotor of the rotation drive source 21 on the basis of the moving speed in accordance with the moving speed pattern outputted from the speed limiter 402, the deviation of the speed detected by a speed detection means 404 from the speed based on the moving speed pattern is proportional-, integral-, and differential-controlled by the controller 407; only the portion of the manipulated variable control signal outputted from the controller 407 the level whereof exceeds the level of the torque limit value signal is limited to the level of the torque limit value signal e or f by the torque limiter 408; the difference between the torque for the rotation drive source 21 given by the torque conversion means 410 and the signal outputted from the torque limiter 408 is computed by the arithmetic circuit 411, and PWM-modulated; and the stator current for the rotation drive source 21 is controlled by the inverter circuit 413 on the basis of the PWM-modulated signal, the rotation drive source 21 being rotation-driven or braked, and thus the torque for the rotation drive source 21 being controlled to the level of the torque limit value signal supplied to the torque limiter 408.

On the other hand, the position of the moving member 18 detected by the position detection means 405 is compared with the counterclockwise direction end identifying positional information, the clockwise direction end identifying positional information, the predetermined set range lower end positional information and upper end positional information, the counterclockwise direction out-of-range identifying positional information, the clockwise direction end out-of-range identifying positional information, and an identifying output based on the position of the moving member 18 is delivered.

In the above description, a case where a duty ratio setting device A or B (not shown) generates a slow up/slow down signal a or b; a voltage setting device C or D (not shown) generates a speed limiting signal c or d; and a voltage setting device E or F (not shown) generates a torque limit value signal e or f and a speed limiting signal c or d is exemplified, however, the time and period of each ON state for these signals a to f and the switches S1, S2, S3, S4, S5, and S6 may be controlled by a controller (not shown) comprising a microcomputer, for example, on the basis of the mode instruction inputted. Examples of control in this case will be described hereinafter.

Figure 14A:
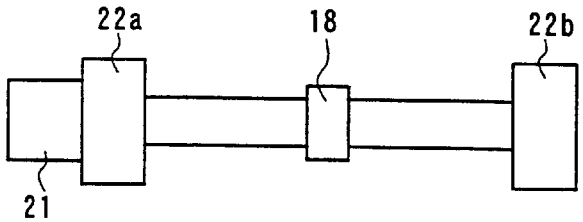
FIG. 14A and FIG. 14B show a schematic configuration drawing illustrating the state wherein the moving member is moved in the set direction in the state wherein the actuator is disposed horizontally.

For example, as shown in FIG. 14A, when the actuator 10 is disposed horizontally, and the operation mode 1 and that the moving direction specifying signal r is to have a positive polarity, i.e., the rotor of the rotation drive source 21 is to be rotation-driven in a counterclockwise direction are instructed for the controller, the moving member 18 is driven toward the right side in FIG. 14A. In this case, as shown in FIG. 14C, the switches S1, S2, S3, S4, and S5 are energized to respective ON states (see "1" in FIG. 14C) in sequence, the speed pattern P as shown in FIG. 14C being formed; the moving member 18 is moved rightward at a speed based on this speed pattern P, and brought into a pressed-against state at the right end; and then, the torque is switched over to, for example, 50% of the torque rating for the rotation drive source 21 as set by the torque limit value signal e or f, being controlled to a torque value of 50% of the torque rating for the rotation drive source 21.

Figure 14B:
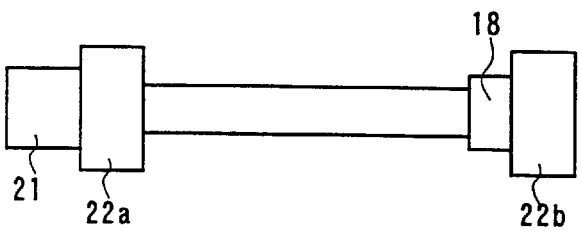
Figure 14C:
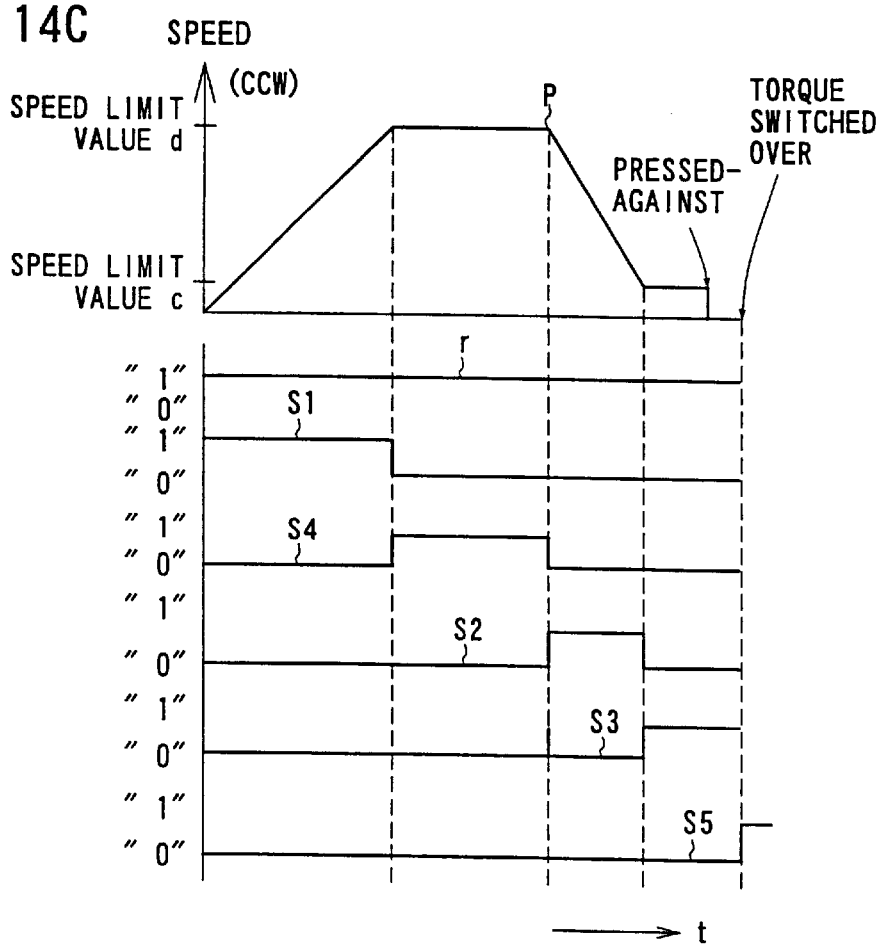
FIG. 14C shows an explanatory diagram illustrating the speed pattern when the moving member is moved.

Thus, as shown in FIG. 14B, the moving member 18 is brought into the state wherein it is pressed against the end plate 22b serving as a stopper, and the torque at that time is controlled to a torque value of 50% of the torque rating for the rotation drive source 21.

Figure 15A:
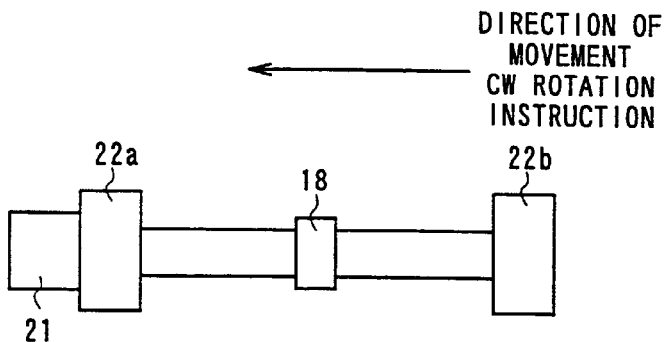
FIG. 15A and FIG. 15B show a schematic configuration drawing illustrating the state wherein the moving member is moved in the direction opposite to the above-mentioned one in the state wherein the actuator is disposed horizontally.

Further, for example, as shown in FIG. 15A, when the actuator 10 is disposed horizontally, and the operation mode 2 and that the moving direction specifying signal r is to have a negative polarity, i.e., the rotor of the rotation drive source 21 is to be rotation-driven in a clockwise direction are instructed for the controller, the moving member 18 is driven toward the left side in FIG. 15A. In this case, as shown in FIG. 15C, the switches S1, S2, S3, S4, and S5 are energized to respective ON states in sequence, the speed pattern P' as shown in FIG. 15C being formed; the moving member 18 is moved leftward at a speed based on this speed pattern P', and brought into a pressed-against state at the left end; and then, the torque is switched over to, for example, 50% of the torque rating for the rotation drive source 21 as set by the torque limit value signal e or f, being controlled to a torque value of 50% of the torque rating for the rotation drive source 21.

Figure 15B:
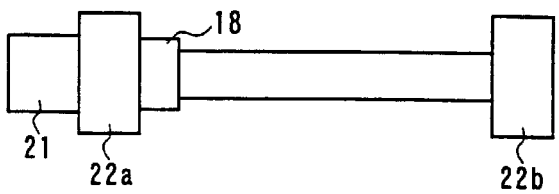
Figure 15C:
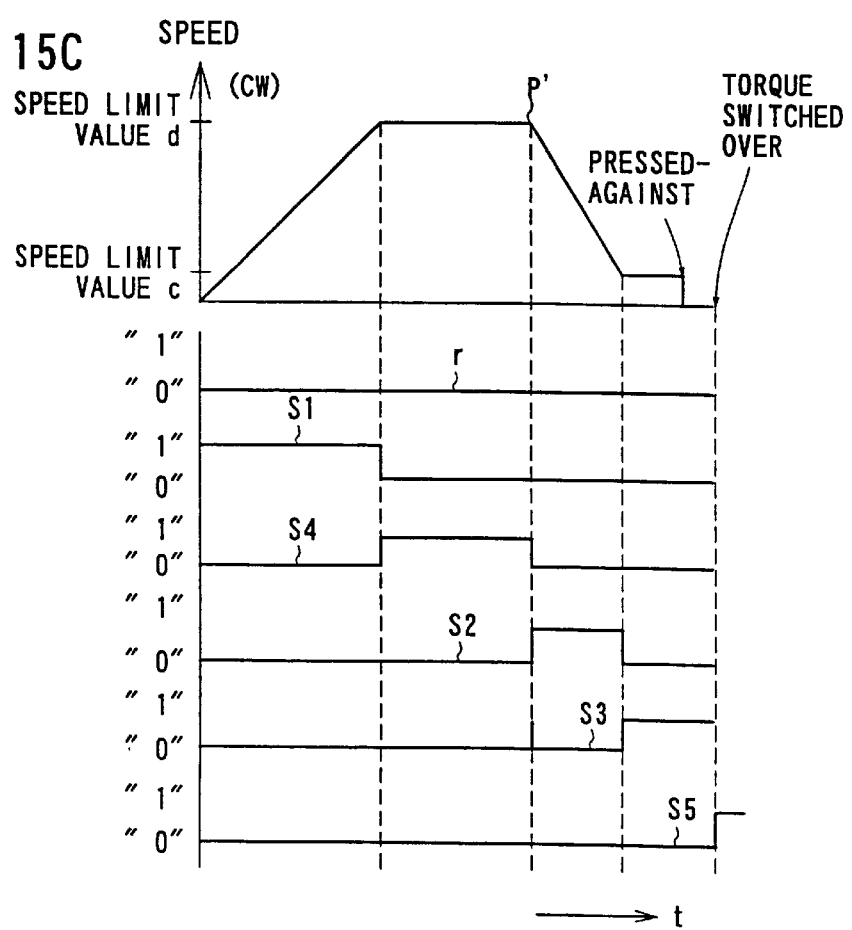
FIG. 15C shows an explanatory diagram illustrating the speed pattern when the moving member is moved.

Thus, as shown in FIG. 15B, the moving member 18 is brought into the state wherein it is pressed against the end plate 22a serving as a stopper, and the torque at that time is controlled to a torque value of 50% of the torque rating for the rotation drive source 21. In this case, the pattern P' should be expressed symmetrically about the t-axis with a dotted line as shown in FIG. 13A, however, in FIG. 15C, it is given in a simplified form.

Figure 16A:
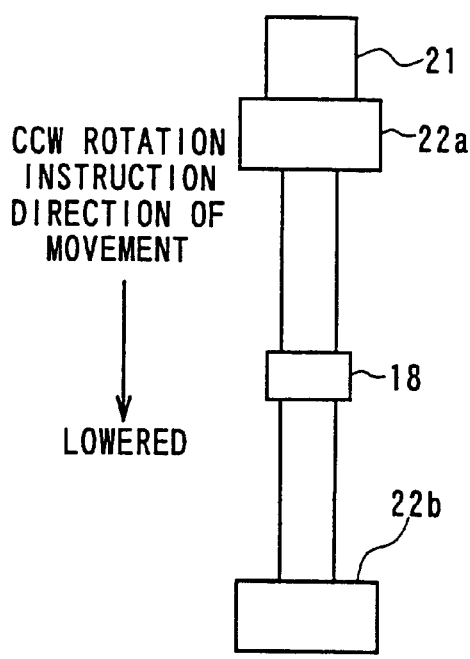
FIG. 16A shows a schematic configuration drawing illustrating the state wherein the moving member is lowered in the state wherein the actuator is disposed vertically.
Figure 16B:
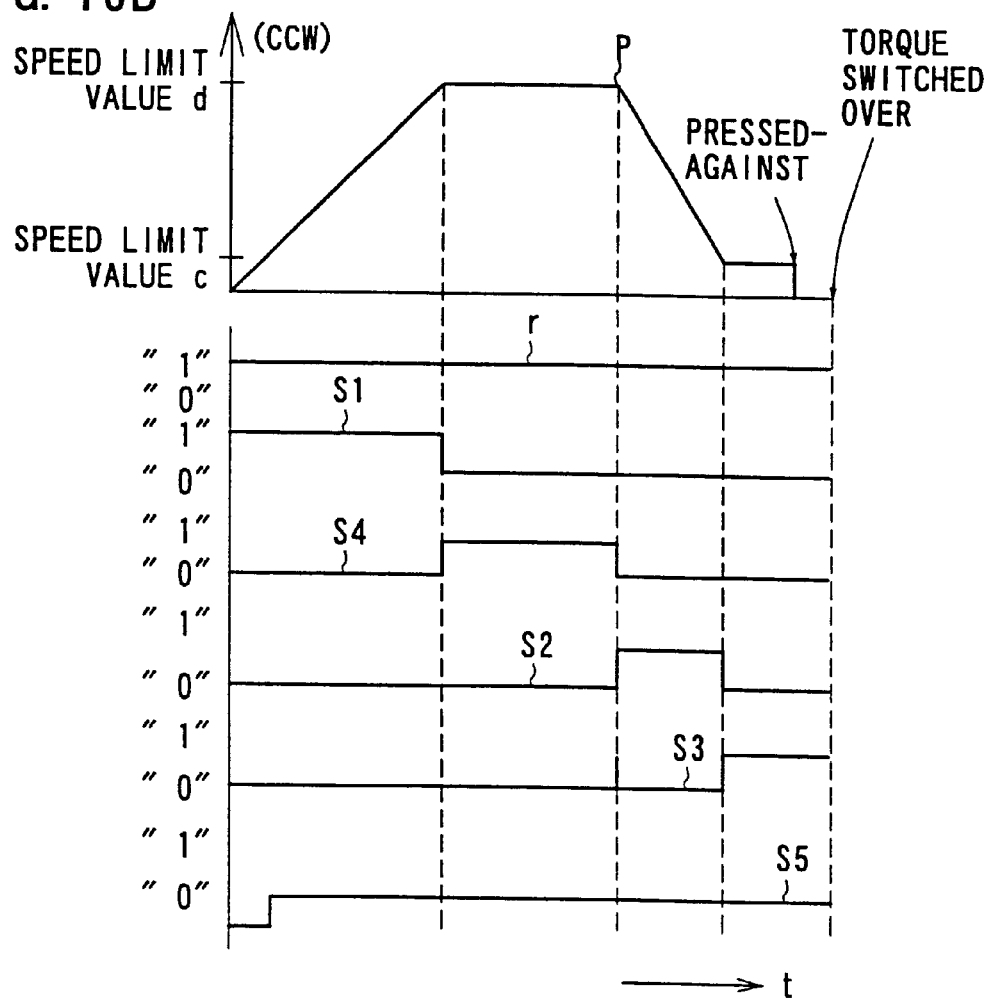
FIG. 16B shows an explanatory diagram illustrating the speed pattern when the moving member is lowered.

Further, for example, as shown in FIG. 16A, when the actuator 10 is disposed vertically, and the operation mode 2 and that the moving direction specifying signal r is to have a positive polarity, i.e., the rotor of the rotation drive source 21 is to be rotation-driven in a counterclockwise direction are instructed for the speed profile generator 401, the moving member 18 is driven downward in FIG. 16A. In this case, as shown in FIG. 16B, the switches S1, S2, S3, S4, and S5 are energized to respective ON states in sequence, the speed pattern P as shown in FIG. 16B being formed; the moving member 18 is moved downward at a speed based on this speed pattern P, and brought into the state wherein it is pressed against the end plate 22b.

On the other hand, from a position slightly lower than the position where the moving member 18 is pressed against the end plate 22a, the switch S5 is made the ON state, and then the torque is switched over to, for example, 0% of the torque rating for the rotation drive source 21 as set by the torque limit value signal e or f, being controlled to a torque value of 0%. Therefore, as shown in FIG. 16A, while the moving member 18 is being lowered, it is in the state wherein the torque is at 0%, and in that state, it is brought into a pressed-against state. Consequently, if such a substance as a foreign matter is between the moving member 18 and the end plate 22b, no pressing force is applied to the substance by the moving member 18 which is being driven by the rotation drive source 21.

Figure 17A:
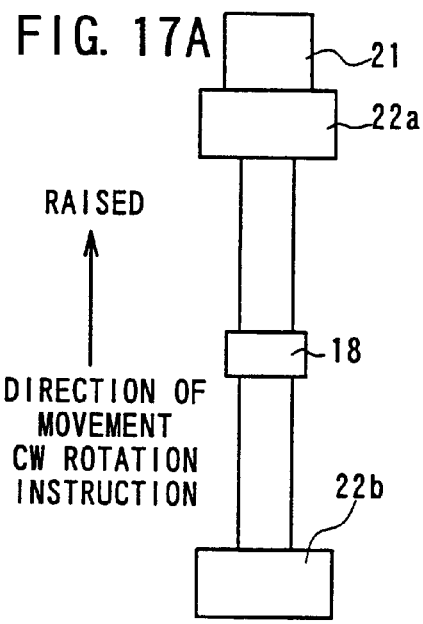
FIG. 17A and FIG. 17B show a schematic configuration drawing illustrating the state wherein the moving member is raised in the state wherein the actuator is disposed vertically.

Further, for example, as shown in FIG. 17A, when the actuator 10 is disposed vertically, and the operation mode 2 and that the moving direction specifying signal r is to have a negative polarity, i.e., the rotor of the rotation drive source 21 is to be rotation-driven in a clockwise direction are instructed for the speed profile generator 401, the moving member 18 is driven upward in FIG. 17A. In this case, as shown in FIG. 17C, the switches S1, S2, S3, S4, and S5 are energized to respective ON states in sequence, the speed pattern P' as shown in FIG. 17C being formed; the moving member 18 is moved upward at a speed based on this speed pattern P', and brought into a pressed-against state at the upper end; and then, the torque is switched over to, for example, 50% of the torque rating for the rotation drive source 21 as set by the torque limit value signal e or f, being controlled to a torque value of 50% of the torque rating for the rotation drive source 21.

Figure 17B:
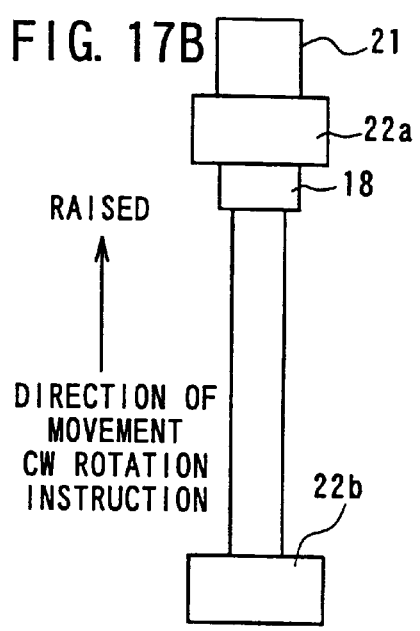
Figure 17C:
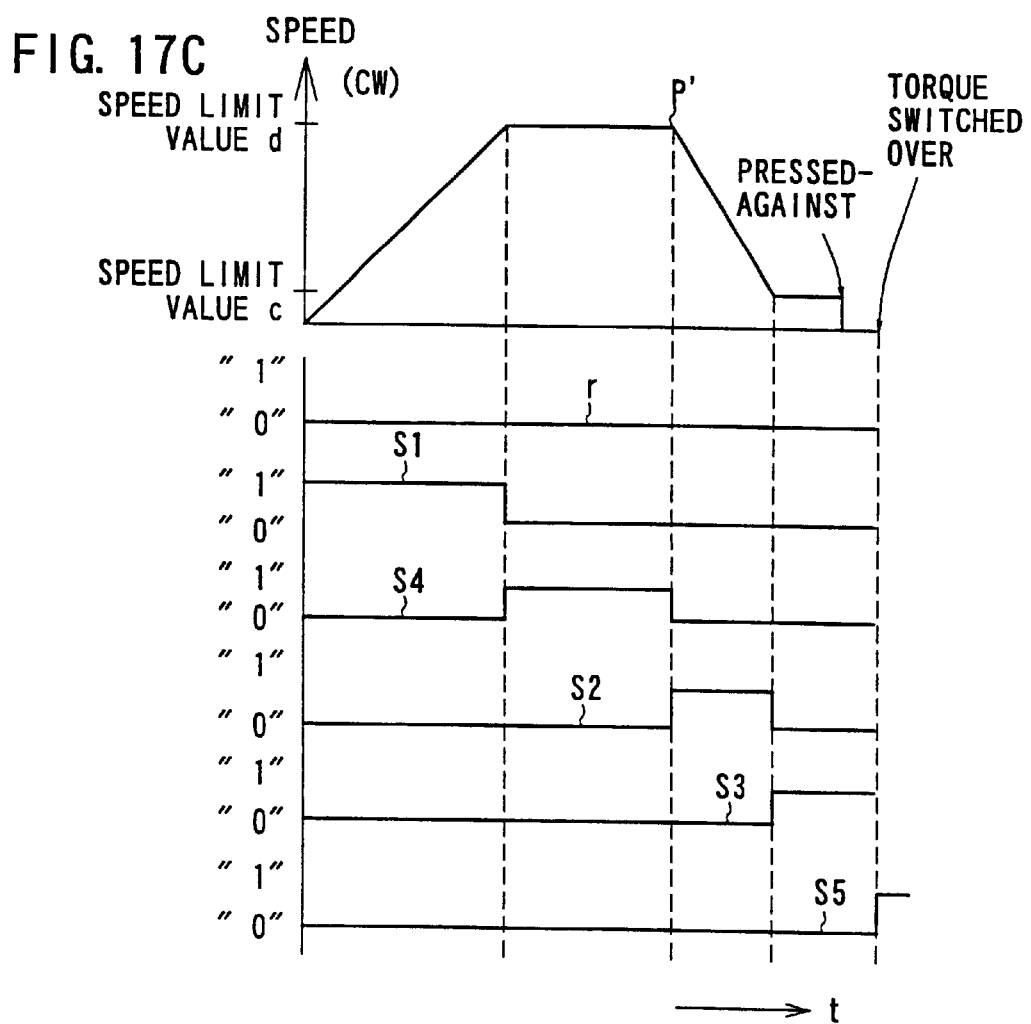
FIG. 17C shows an explanatory diagram illustrating the speed pattern when the moving member is raised.
Figure 19:
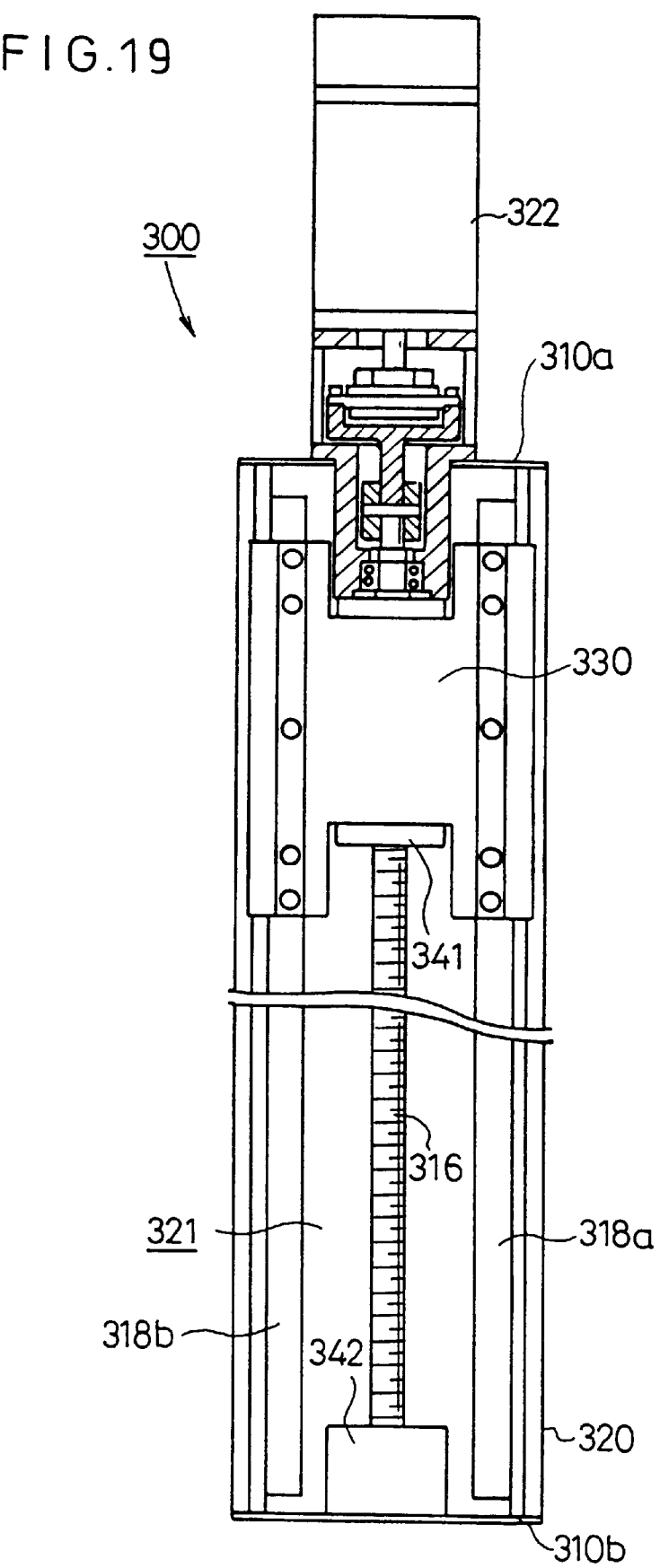
FIG. 19 shows a front view, partially in cross section, of another motor-operated actuator according to the prior art.

Thus, as shown in FIG. 17B, the moving member 18 is brought into the state wherein it is pressed against the end plate 22a, and the torque at that time is controlled to a torque value of 50% of the torque rating for the rotation drive source 21. In this case, the pattern P' should be expressed symmetrically about the t-axis with a dotted line as shown in FIG. 14A, however, in FIG. 17C, it is given in a simplified form.

Industrial Applicability

With the actuator according to the present invention, an opening which allows the driving force transmission shaft to be inserted from the direction perpendicular to the axis thereof is formed in the moving block, and thus the driving force transmission shaft can be replaced conveniently and inexpensively. Therefore, assembling and maintenance operations for the driving force transmission shaft can be made with ease.

Further, the frame is formed by integrally jointing a plurality of separate block members through connecting means, thus, the frame can be conveniently reassembled to suit to the operating environment.

Further, with the controlling device for the actuator according to the present invention, the torque for the rotation drive source which drives the actuator is controlled on the basis of the torque limit value signal, and the torque for the rotation drive source can be easily set by means of the torque limit value signal, thus, the torque setting for the rotation drive source can be easily changed to suit to the operating conditions, which allows the torque to be set at an optimum value for the workpiece conditions.

What is claimed is:

1. An actuator comprising:
   a frame which constitutes an outer frame;
   a driving section connected to said frame;
   a driving force transmission shaft which transmits a driving force of said driving section;
   a moving member installed in said frame, said moving member being displaced along a longitudinal axis of said frame by said driving force transmitted through said driving force transmission shaft under a driving action of said driving section;
   a guide mechanism provided between said frame and said moving member, wherein said guide mechanism has a rolling groove integrally formed in an inner wall surface of said frame, and a plurality of rolling members which roll along said rolling groove; and
   said moving member having a moving block, wherein an opening is formed on a top side of said moving block exposed when said moving member is installed in said frame which allows said driving force transmission shaft to be inserted into said moving block installed in said frame from a direction perpendicular to said longitudinal axis of said frame.

2. The actuator according to claim 1, wherein said frame is formed by integrally joining a plurality of separate block members through a connecting member.

3. The actuator according to claim 1, further comprising a pair of sealing members to prevent dirt, dusts and other matters produced inside said frame from getting out of said frame.

4. The actuator according to claim 3, wherein said pair of sealing members includes a first sealing member held by said frame and a second sealing member held by a top cover loaded above an opening of said frame, said first sealing member and said second sealing member being formed from a flexible material, and said first and second sealing members being provided along said longitudinal axis of said frame so that parts of said first and second sealing members overlap each other to close up a gap between said frame and said top cover.

5. The actuator according to claim 2, wherein said frame can be freely reassembled through said connecting member.

6. The actuator according to claim 1, further comprising an oil sump hole formed to communicate with said rolling groove.

7. The actuator according to claim 1, further comprising a frame concavity filling member which is separate from said frame, wherein said frame concavity filling member has at least one of said rolling groove formed on one side thereof and said frame cavity filling member is integrally assembled into a concavity of said frame.

8. The actuator according to claim 1, further comprising a moving block concavity filling member which is separate from said moving block, wherein said moving block concavity filling member has at least one of said rolling groove formed on one side thereof and said moving block cavity filling member is integrally assembled into a concavity of said moving block.

9. A controlling device for an actuator comprising:
   a rotational speed detection section which detects a rotational speed of a rotation drive source which drives a moving member of the actuator;
   a speed pattern generation section which generates a speed pattern, said speed pattern generation section including a speed profile generator which, based upon a supplied slow up/slow down signal, slows up or slows down said rotational speed of said rotation drive source, and which, based upon a polarity of a supplier moving direction specifying signal, switches over a direction of rotation of said rotation drive source;

a control section which controls said rotational speed detected by said rotational speed detection section by limiting said rotational speed to a speed based on said speed pattern generated by said speed pattern generation section;

a torque limiting section which limits a level of a manipulated variable control signal outputted from said control section to a level of a supplied torque limit value signal;

a torque detection section which detects a torque for said rotation drive source; and a duty ratio control section which, based upon said manipulated variable control signal outputted through said torque limiting section, controls an amount of current supplied to said rotation drive source for controlling said torque detected by said torque detection section to said level of said supplied torque limit value signal.

10. The controlling device for the actuator according to claim 9, wherein said speed pattern generation section further includes a speed limiter which, based upon a supplied speed limit signal, limits a level of an output signal from said speed profile generator, said speed pattern being set under cooperation between said speed profile generator and said speed limiter.

11. The actuator according to claim 1, further comprising a moving block concavity filling member which is separate from said moving block, wherein said moving block concavity filling member has at least one of said rolling groove formed on one side thereof and said moving block cavity filling member is integrally assembled into a concavity of said moving block.

12. An actuator comprising:

a frame which constitutes an outer frame;

a driving section connected to said frame;

a driving force transmission shaft which transmits a driving force of said driving section;

a moving member installed in said frame, said moving member being displaced along a longitudinal axis of said frame by said driving force transmitted through said driving force transmission shaft under a driving action of said driving section;

a pair of sealing members to prevent dirt, dust and other matters produced inside said frame from getting out of said frame; and said moving member having a moving block, wherein an opening is formed on a top side of said moving block exposed when said moving member is installed in said frame which allows said driving force transmission shaft to be inserted into said moving block installed in said frame from a direction perpendicular to said longitudinal axis of said frame.

13. The actuator according to claim 12, wherein said pair of sealing members includes a first sealing member held by said frame, and a second sealing member held by a top cover loaded above an opening of said frame, each of said first and second sealing members being formed from a flexible material, and each of said first and second sealing members being provided along said longitudinal axis of said frame so that part of said first and second sealing members overlap each other to close up a gap between said frame and said top cover.

14. The actuator according to claim 12, wherein said frame is formed by integrally joining a plurality of separate block members through a connecting member.

15. The actuator according to claim 14, wherein said frame can be freely reassembled through said connecting member.

16. The actuator according to claim 12, further comprising a guide mechanism provided between said frame and said moving member, wherein said guide mechanism has a rolling groove integrally formed in an inner wall surface of said frame, and a plurality of rolling members which roll along said rolling groove.

17. The actuator according to claim 16, further comprising an oil sump hole formed to communicate with said rolling groove.

18. The actuator according to claim 16, further comprising a frame concavity filling member which is separate from said frame, wherein said frame concavity filling member has at least one of said rolling groove formed on one side thereof and said frame cavity filling member is integrally assembled into a concavity of said frame.

* * * * *